United States Patent
Zhao et al.

(10) Patent No.: US 11,677,968 B2
(45) Date of Patent: Jun. 13, 2023

(54) SYSTEMS AND METHODS FOR CODING VIDEO DATA USING ADAPTIVE COMPONENT SCALING

(71) Applicants: Sharp Kabushiki Kaisha, Sakai (JP); FG Innovation Company Limited, Tuen Mun (HK)

(72) Inventors: Jie Zhao, Vancouver, WA (US); Seung-Hwan Kim, Vancouver, WA (US); Kiran Mukesh Misra, Vancouver, WA (US); Christopher Andrew Segall, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/729,019

(22) Filed: Apr. 26, 2022

(65) Prior Publication Data

US 2022/0264128 A1    Aug. 18, 2022

Related U.S. Application Data

(63) Continuation of application No. 17/163,619, filed on Feb. 1, 2021, now Pat. No. 11,343,521, which is a continuation of application No. 16/318,384, filed as application No. PCT/JP2017/025259 on Jul. 11, 2017, now Pat. No. 10,944,976.

(Continued)

(51) Int. Cl.
*H04N 19/186* (2014.01)
*H04N 19/33* (2014.01)
*H04N 19/14* (2014.01)
*H04N 19/176* (2014.01)
*G06F 17/18* (2006.01)
*H04N 19/117* (2014.01)
*H04N 19/136* (2014.01)
*H04N 19/119* (2014.01)
*H04N 19/82* (2014.01)
*H04N 19/61* (2014.01)
*H04N 19/126* (2014.01)

(52) U.S. Cl.
CPC ............. *H04N 19/33* (2014.11); *G06F 17/18* (2013.01); *H04N 19/117* (2014.11); *H04N 19/119* (2014.11); *H04N 19/126* (2014.11); *H04N 19/136* (2014.11); *H04N 19/14* (2014.11); *H04N 19/176* (2014.11); *H04N 19/186* (2014.11); *H04N 19/61* (2014.11); *H04N 19/82* (2014.11)

(58) Field of Classification Search
None
See application file for complete search history.

(56) References Cited

U.S. PATENT DOCUMENTS 11,343,521 B2 *   5/2022   Zhao ................... H04N 19/119

OTHER PUBLICATIONS

Zhao et al., "Systems and Methods for Coding Video Data Using Adaptive Component Scaling", U.S. Appl. No. 17/163,619, filed Feb. 1, 2021.

* cited by examiner

*Primary Examiner* — Christopher G Findley
(74) *Attorney, Agent, or Firm* — Keating & Bennett, LLP

(57) ABSTRACT

A method of encoding and decoding video data is described. According to an aspect of an invention, luma and chroma components may have separate quadtree plus binary tree (QTBT) structures and a scaling parameter for a chroma coding block is determined based on one or more properties of a luma component.

1 Claim, 16 Drawing Sheets

Related U.S. Application Data

(60) Provisional application No. 62/365,908, filed on Jul. 22, 2016.

SYSTEMS AND METHODS FOR CODING VIDEO DATA USING ADAPTIVE COMPONENT SCALING

CROSS REFERENCE

This Nonprovisional application claims priority under 35 U.S.C. § 119 on provisional Application No. 62/365,908 on Jul. 22, 2016, the entire contents of which are hereby incorporated by reference.

TECHNICAL FIELD

This disclosure relates to video coding and more particularly to techniques for adaptive component scaling.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards may incorporate video compression techniques. Examples of video coding standards include ISO/IEC MPEG4 Visual and ITU-T H.264 (also known as ISO/IEC MPEG-4 AVC) and High-Efficiency Video Coding (HEVC). HEVC is described in High Efficiency Video Coding (HEVC). Rec. ITU-T 11.265 April 2015, which is incorporated by reference, and referred to herein as ITU-T H.265. Extensions and improvements for ITU-T H.265 are currently being considered for development of next generation video coding standards. For example, the ITU-T Video Coding Experts Group (VCEG) and ISO/IEC (Moving Picture Experts Group (MPEG) (collectively referred to as the Joint Video Exploration Team (JVET)) are studying the potential need for standardization of future video coding technology with a compression capability that significantly exceeds that of the current HEVC standard. The Joint Exploration Model 3 (JEM 3), Algorithm Description of Joint Exploration Test Model 3 (JEM 3), ISO/IEC JTC1/SC29/WG11 Document: JVET-C1001v3, May 2016, Geneva, CH, which is incorporated by reference herein, describes the coding features that are under coordinated test model study by the JVET as potentially enhancing video coding technology beyond the capabilities of ITU-T H.265. It should be noted that the coding features of JEM 3 are implemented in JEM reference software maintained by the Fraunhofer research organization. Currently, the updated JEM reference software version 3 (JEM 3.0) is available. As used herein, the term JEM is used to collectively refer to algorithm descriptions of JEM 3 and implementations of JEM reference software.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of frames within a video sequence, a frame within a group of frames, slices within a frame, coding tree units (e.g., macroblocks) within a slice, coding blocks within a coding tree unit, etc.). Intra prediction coding techniques (e.g., intra-picture (spatial)) and inter prediction techniques (i.e., inter-picture (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, motion vectors, and block vectors). Residual data and syntax elements may be entropy coded. Entropy encoded residual data and syntax elements may be included in a compliant bitstream.

SUMMARY OF INVENTION

In general, this disclosure describes various techniques for coding video data. In particular, this disclosure describes techniques for adaptive component scaling. It should be noted that although techniques of this disclosure are described with respect to ITU-T H.264, ITU-T H.265, and JEM, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265 and JEM. Thus, reference to ITU-T H.264, ITU-T H.265, and/or JEM is for descriptive purposes and should not be construed to limit the scope to of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

An aspect of the invention is a method of encoding video data, the method comprising: receiving video data values corresponding to a chroma coding block, wherein the chroma coding block is independent of a luma component partition structure; determining a scaling parameter for the chroma coding block based on one or more properties of the luma component; and generating level values based on the scaling parameter.

An aspect of the invention is a method of decoding video data, the method comprising: receiving level values corresponding to a chroma coding block, wherein the chroma coding block is independent of a luma component partition structure; determining a scaling parameter for the chroma coding block based on one or more properties of the luma component; and generating video data values based on the determined scaling parameter.

DESCRIPTION OF EMBODIMENTS

Video content typically includes video sequences comprised of a series of frames. A series of frames may also be referred to as a group of pictures (GOP). Each video frame or picture may include a plurality of slices or tiles, where a slice or tile includes a plurality of video blocks. As used herein, the term video block may generally refer to an area of a picture, including one or more video components, or may more specifically refer to the largest array of pixel/sample values that may be predictively coded, sub-divisions thereof, and/or corresponding structures. Further, the term current video block may refer to an area of a picture being encoded or decoded. A video block may be defined as an array of pixel values (also referred to as samples) that may be predictively coded. Video blocks may be ordered according to a scan pattern (e.g., a raster scan). A video encoder may perform predictive encoding on video blocks and sub-divisions thereof. Video blocks and sub-divisions thereof may be referred to as nodes. ITU-T H.264 specifies a macroblock including 16×16 luma samples. ITU-T H.265 specifies an analogous Coding Tree Unit (CTU) structure where a picture may be split into CTUs of equal size and each CTU may include Coding Tree Blocks (CTB) having 16×16, 32×32, or 64×64 luma samples. In ITU-T H.265, the CTBs of a CTU may be partitioned into Coding Blocks (CB) according to a corresponding quadtree block structure. According to ITU-T H.265, one luma CB together with two corresponding chroma CBs (e.g., Cr and Cb chroma components) and associated syntax elements are referred to as a coding unit (CU). In ITU-T H.265, a minimum allowed size of a CB may be signaled. In ITU-T H.265, the smallest minimum allowed size of a luma CB is 8×8 luma samples. A CU is associated with a prediction unit (PU) structure defining one or more prediction units (PU) for the CU, where a PU is associated with corresponding reference samples. That is, in ITU-T H.265, the decision to code a picture area using intra prediction or inter prediction is made at the CU level. In ITU-T H.265, a PU may include luma and chroma prediction blocks (PBs), where square PBs are supported for intra prediction and rectangular PBs are supported for inter prediction. Intra prediction data (e.g., intra prediction mode syntax elements) or inter prediction data (e.g., motion data syntax elements) may associate PUs with corresponding reference samples.

Figure 2:
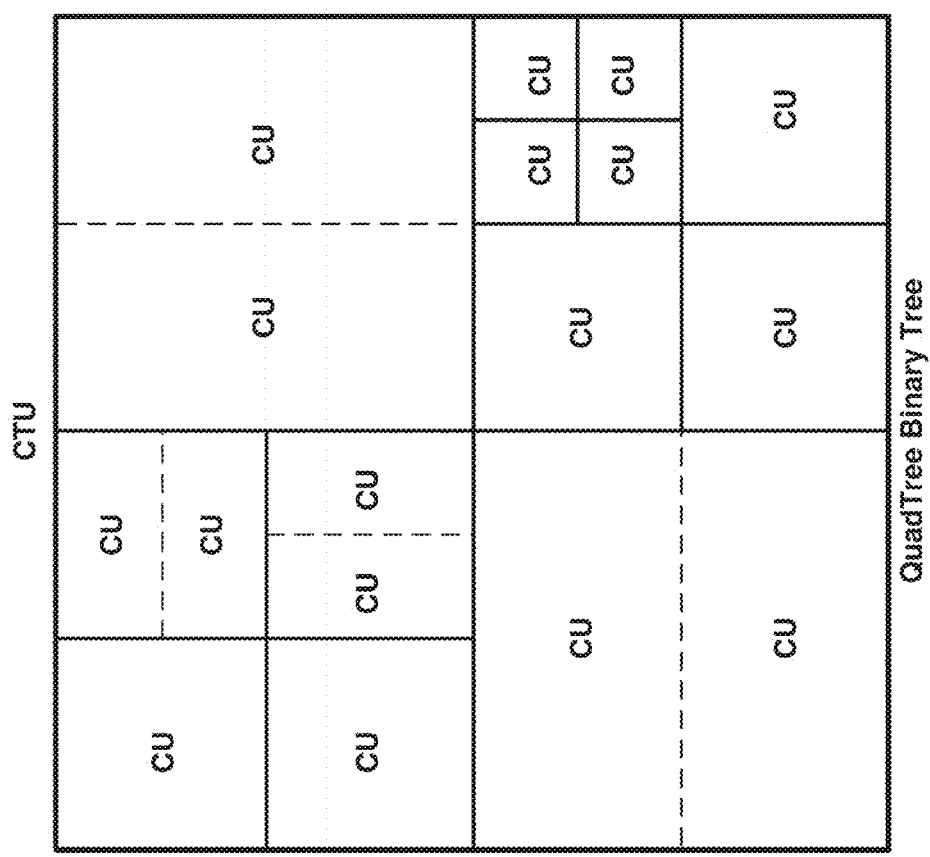
FIG. 2 is a conceptual diagram illustrating a quad tree binary tree partitioning in accordance with one or more techniques of this disclosure.
Figure 2:
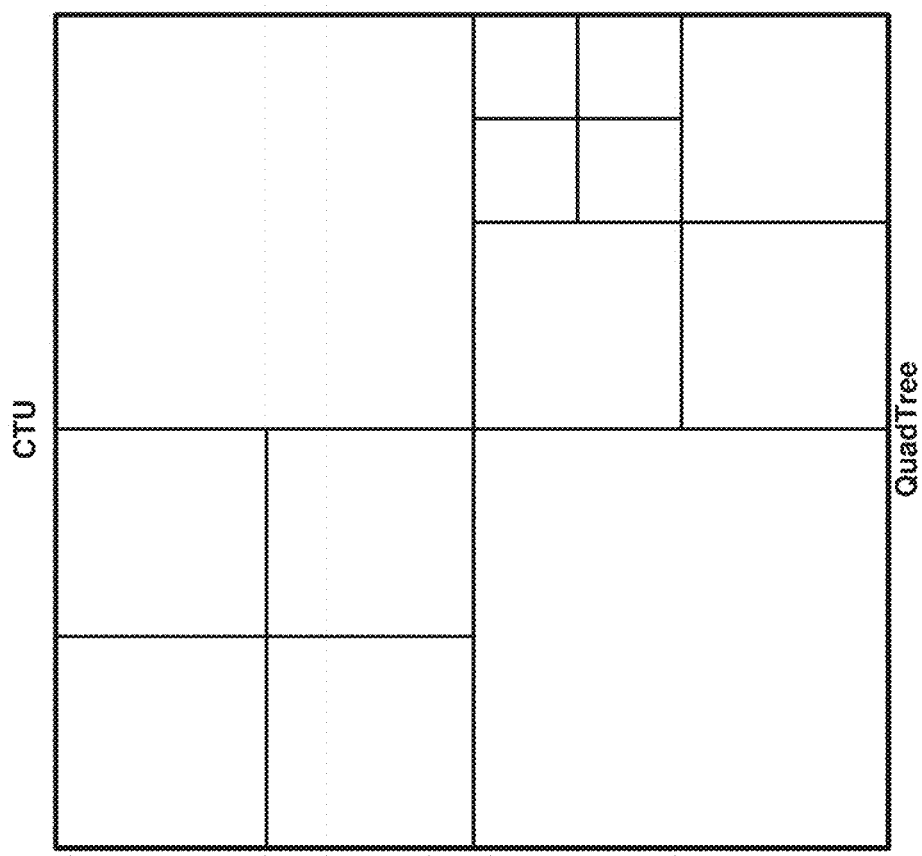
Figure 3:
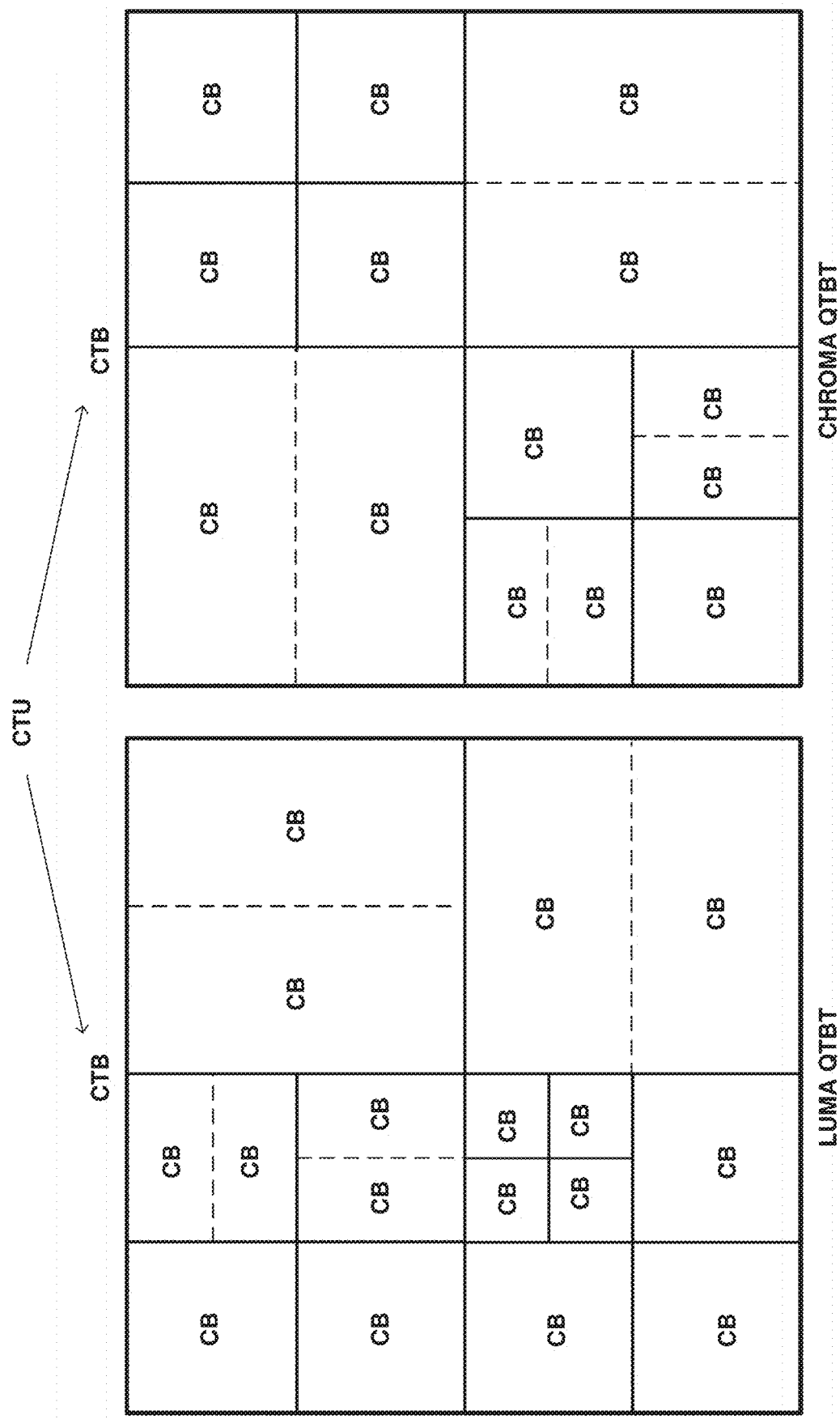
FIG. 3 is a conceptual diagram illustrating independent quad tree binary tree partitioning of video components in accordance with one or more techniques of this disclosure.

JEM specifies a CTU having a maximum size of 256×256 luma samples. In JEM, CTUs may be further partitioned according a quadtree plus binary tree (QTBT) block structure. In JEM, the QTBT structure enables quadtree leaf nodes to be further partitioned by a binary tree structure. In JEM, the binary tree structure enables quadtree leaf nodes to be divided vertically or horizontally. FIG. 2 illustrates an example of a CTU (e.g., a CTU having a size of 256×256 luma samples) being partitioned into quadtree leaf nodes and quadtree leaf nodes being further partitioned according to a binary tree. That is, in FIG. 2 dashed lines indicate binary tree partitions. Thus, the binary tree structure in JEM enables square and rectangular leaf nodes, where each leaf node includes a Coding Block (CB) for each component of video data. In JEM, CBs may be used for prediction without any further partitioning. Further, in JEM, luma and chroma components may have separate QTBT structures. That is, chroma CBs may be independent of luma partitioning. In JEM, separate QTBT structures are enabled for slices of video data coded using intra prediction techniques. FIG. 3 illustrates an example of a CTU being partitioned according to a QTBT for a luma component and an independent QTBT for chroma components. As illustrated in FIG. 3, when independent QTBTs are used for partitioning a CTU, CBs of the luma component do not necessarily align with CBs of chroma components.

It should be noted that JEM includes the following parameters for signaling of a QTBT tree:

CTU size: the root node size of a quadtree (e.g., 256×256, 128×128, 64×64, 32×32, 16×16 luma samples);

MinQTSize: the minimum allowed quadtree leaf node size (e.g., 16×16, 8×8 luma samples);

MaxBTSize: the maximum allowed binary tree root node size, i.e., the maximum size of a leaf quadtree node that may be partitioned by binary splitting (e.g., 64×64 luma samples);

MaxBTDepth: the maximum allowed binary tree depth, i.e., the lowest level at which binary splitting may occur (e.g., 3);

MinBTSize: the minimum allowed binary tree leaf node size; i.e., the minimum width or height of a binary leaf node (e.g., 4 luma samples).

Figure 4:
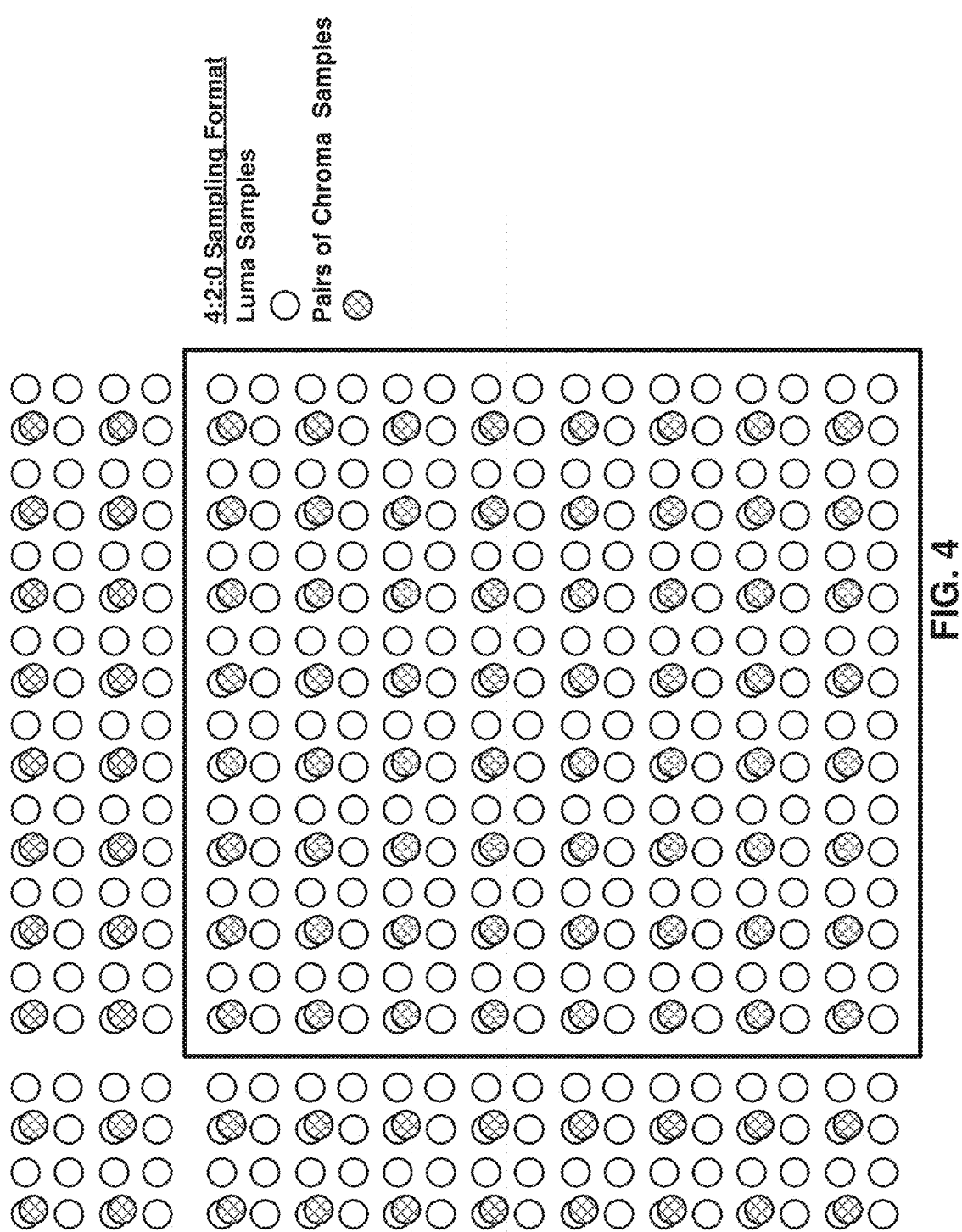
FIG. 4 is a conceptual diagram illustrating an example of a video component sampling format in accordance with one or more techniques of this disclosure.

A video sampling format, which may also be referred to as a chroma format, may define the number of chroma samples included in a CU with respect to the number of luma samples included in a CU. For example, for the 4:2:0 format, the sampling rate for the luma component is twice that of the chroma components for both the horizontal and vertical directions. As a result, for a CU formatted according to the 4:2:0 format, the width and height of an array of samples for the luma component are twice that of each array of samples for the chroma components. FIG. 4 is a conceptual diagram illustrating an example of a coding unit formatted according to a 4:2:0 sample format. FIG. 4 illustrates the relative position of chroma samples with respect to luma samples within a CU. As described above, a CU is typically defined according to the number of horizontal and vertical luma samples. Thus, as illustrated in FIG. 4, a 16×16 CU formatted according to the 4:2:0 sample format includes 16×16 samples of luma components and 8×8 samples for each chroma component. Further, in an example, the relative position of chroma samples with respect to luma samples for video blocks neighboring the 16×16 are illustrated in FIG. 4. Similarly, for a CU formatted according to the 4:2:2 format, the width of an array of samples for the luma component is twice that of the width of an array of samples for each chroma component, but the height of the array of samples for the luma component is equal to the height of an array of samples for each chroma component. Further, for a CU formatted according to the 4:4:4 format, an array of samples for the luma component has the same width and height as an array of samples for each chroma component.

The difference between sample values included in a current CU, or another type of picture area structure, and associated reference samples (e.g., those generated using a prediction) may be referred to as residual data. Residual data may include respective arrays of difference values corresponding to each component of video data (e.g., luma (Y) and chroma (Cb and Cr). Residual data may be in the pixel domain. A transform, such as, a discrete cosine transform (DCT), a discrete sine transform (DST), an integer transform, a wavelet transform, or a conceptually similar transform, may be applied to pixel difference values to generate transform coefficients. It should be noted that in ITU-T H.265, CUs may be further sub-divided into Transform Units (TUs). That is, in ITU-T H.265, an array of pixel difference values may be sub-divided for purposes of generating transform coefficients (e.g., four 8×8 transforms may be applied to a 16×16 array of residual values), for each component of video data, such sub-divisions may be referred to as Transform Blocks (TBs). Currently in JEM, when a QTBT partitioning structure is used, residual values corresponding to a CB are used to generate transform coefficients without further partitioning. That is, in JEM a QTBT leaf node may be analogous to both a PB and TB in ITU-T H.265. Further, in JEM, a core transform and a subsequent secondary transforms may be applied (in the encoder) to generate transform coefficients. For a video decoder, the order of transforms is reversed. Further, in JEM, whether a secondary transform is applied to generate transform coefficients may be dependent on a prediction mode.

Figure 5A:
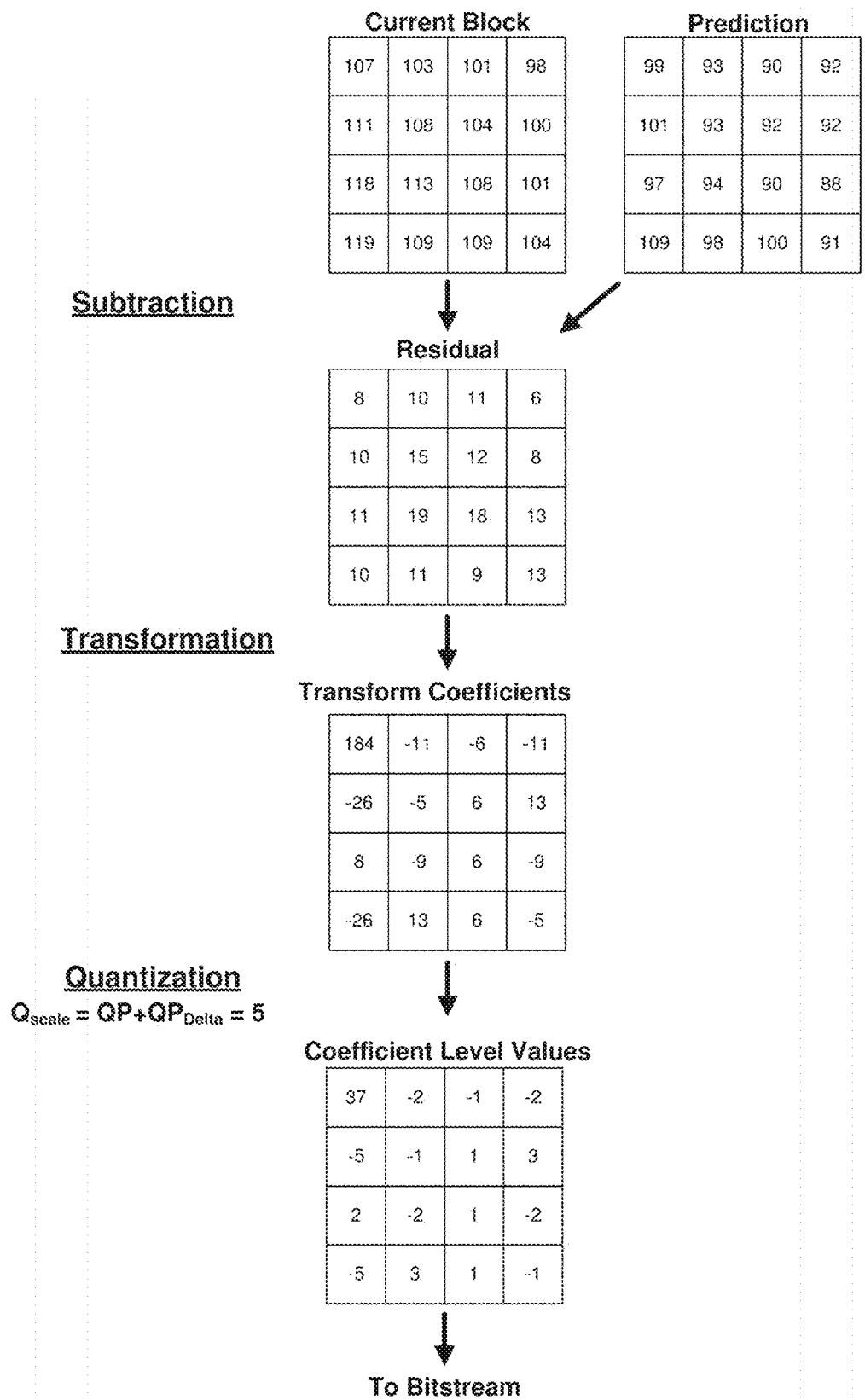
FIG. 5A are conceptual diagrams illustrating examples of coding a block of video data in accordance with one or more techniques of this disclosure.
Figure 5B:
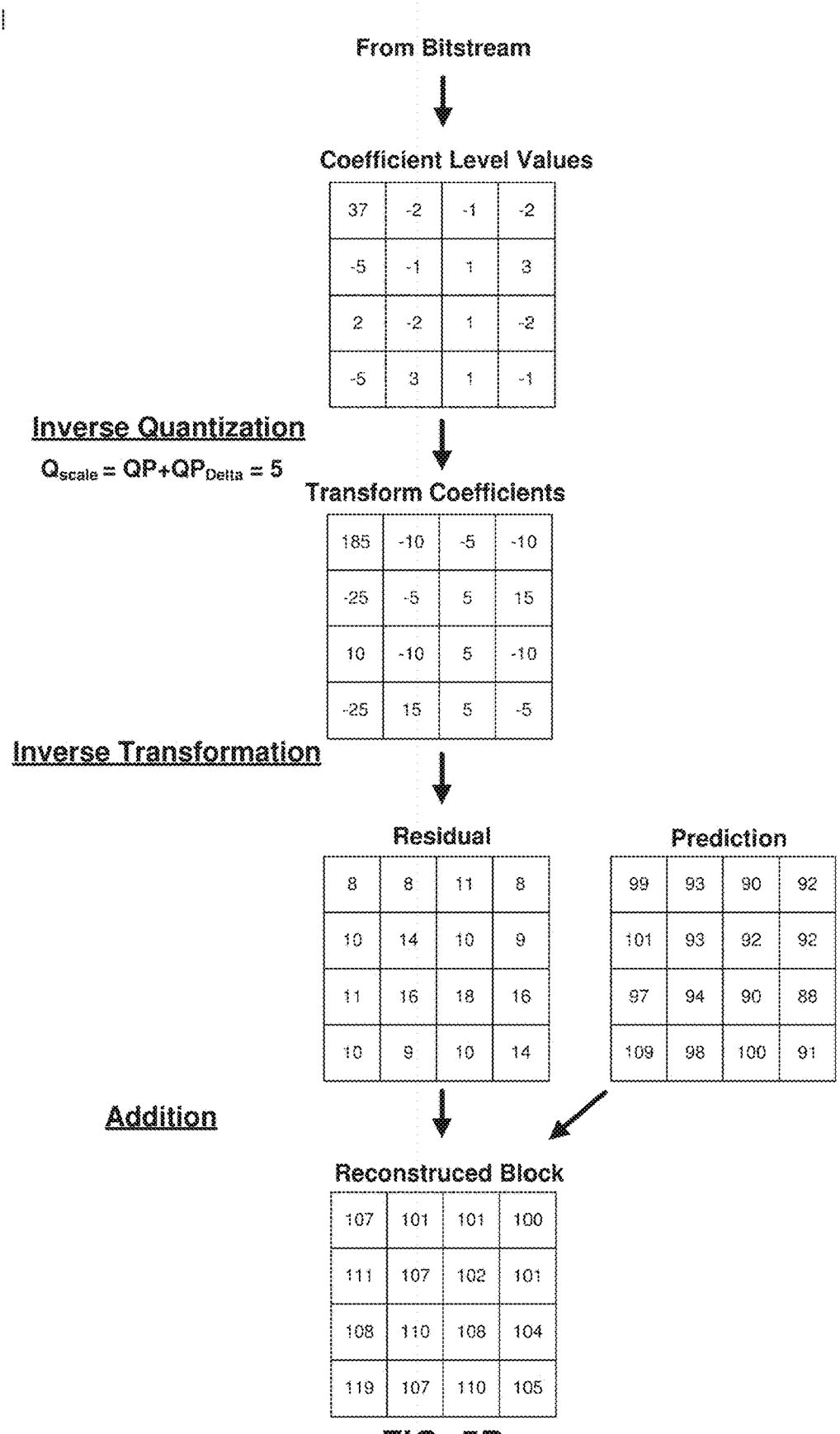
FIG. 5B are conceptual diagrams illustrating examples of coding a block of video data in accordance with one or more techniques of this disclosure.

A quantization process may be performed on transform coefficients. Quantization scales transform coefficients in order to vary the amount of data required to send a group of transform coefficients. Quantization may include division of transform coefficients by a quantization scaling factor and any associated rounding functions (e.g., rounding to the nearest integer). Quantized transform coefficients may be referred to as coefficient level values or simply level values. Inverse quantization (or "dequantization") may include multiplication of coefficient level values by the quantization scaling factor. It should be noted that as used herein the term quantization process in some instances may refer to division by a quantization scaling factor to generate level values and multiplication by a quantization scaling factor to recover transform coefficients in some instances. That is, a quantization process may refer to quantization in some cases and inverse quantization in some cases. Further, it should be noted that although in the examples below quantization processes are described with respect to arithmetic operations associated with decimal notation, such descriptions are for illustrative purposes and should not be construed as limiting. For example, the techniques described herein may be implemented using binary operations and the like. For example, multiplication and division operations described herein may be implemented using bit shifting operations and the like. FIGS. 5A-5B are conceptual diagrams illustrating examples of coding a block of video data. As illustrated in FIG. 5A, a current block of video data (e.g., a CB corresponding to a video component) is encoded by generating residual by subtracting a set of prediction values from the current block of video, performing a transformation on the residual, and quantization of transform coefficients. As illustrated in FIG. 5B, the current block of video data is decoded by performing inverse quantization on level values, performing an inverse transform, and adding a set of prediction values to the resulting residual. It should be noted that in the examples in FIGS. 5A-5B, the sample values of the reconstructed block differs from the sample values of the current video block that is encoded. In this manner, coding may said to be lossy. However, the difference in sample values may be considered acceptable or imperceptible to a viewer of the reconstructed video.

Quantized transform coefficients and related data may be entropy coded according to an entropy encoding technique (e.g., content adaptive variable length coding (CAVLC), context adaptive binary arithmetic coding (CABAC), probability interval partitioning entropy coding (PIPE), etc.). Further, syntax elements, such as, a syntax element indicating a prediction mode, may also be entropy coded. Entropy encoded quantized transform coefficients and corresponding entropy encoded syntax elements may form a compliant bitstream that can be used to reproduce video data. A binarization process may be performed on syntax elements as part of an entropy coding process. Binarization refers to the process of converting a syntax value into a series of one or more bits. These bits may be referred to as "bins." Binarization is a lossless process and may include one or a combination of the following coding techniques: fixed length coding, unary coding, truncated unary coding, truncated Rice coding, Golomb coding, k-th order exponential Golomb coding, and Golomb-Rice coding. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard, for example, ITU-T H.265. After binarization, a CABAC entropy encoder may select a context model. For a particular bin, a context model may be selected from a set of available context models associated with the bin. In some examples, a context model may be selected based on a previous bin and/or values of previous syntax elements. For example, a context model may be selected based on the value of a neighboring intra prediction mode. A context model may identify the probability of a bin being a particular value. For instance, a context model may indicate a 0.7 probability of coding a 0-valued bin and a 0.3 probability of coding a 1-valued bin. After selecting an available context model, a CABAC entropy encoder may arithmetically code a bin based on the identified context model. It should be noted that some syntax elements may be entropy encoded using arithmetic encoding without the usage of an explicitly assigned context model, such coding may be referred to as bypass coding.

As described above, quantization scales transform coefficients in order to vary the amount of data required to send a group of transform coefficients. Equation 1 provides a generalized example of a quantization and Equation 2 provides an example of a corresponding inverse quantization.

$$\text{Level Value} = \text{Round}_{Integer}(\text{Transform Coefficient}/Q_{scale}) \quad \text{EQUATION 1}$$

$$\text{Transform Coefficient} = \text{Level Value} * Q_{scale} \quad \text{EQUATION 2}$$

The degree of quantization may alter the rate-distortion (i.e., bit-rate vs. quality of video) of coded video data. Referring to Equation 1 and Equation 2, the amount of data required to send the coefficient level values and the precision of the recovered transform coefficient values (i.e., dequantized transform coefficients) may be adjusted by changing the value of a quantization scaling factor, $Q_{scale}$. With respect to the example illustrated in FIGS. 5A-5B, varying $Q_{scale}$ from 5 (e.g., to 2) could be used to increase the precision with respect to the reconstructed block (i.e., reduce the lossiness). In ITU-T H.265, the value of a quantization scaling factor (referred to as $Q_{step}$ in ITU-T H.265) may be determined by a quantization parameter. It should be noted that as used herein the term quantization parameter (QP) may be used to refer generally to a parameter used to determining values for quantization (e.g., quantization scaling factors) and/or may be used to more specifically refer to a specific implementation of a quantization parameter (e.g., $Qp'_Y$ in ITU-T H.265). In ITU-T H.265, the quantization parameter can take 52 values from 0 to 51 and a change of 1 for the quantization parameter generally corresponds to a change in the value of the $Q_{step}$ by approximately 12%. Further, in ITU-T H.265, a quantization parameter value for a set of transform coefficients may be derived using a predictive quantization parameter value and an optionally signaled quantization parameter delta value. In ITU-T H.265, a quantization parameter may be updated for each CU and a quantization parameter may be derived for each of luma (Y) and chroma (Cb and Cr) components. In ITU-T H.265, for a current luma coding block in a coding unit, a luma quantization parameter. $Qp'_Y$, may be derived based on a predictive quantization parameter value and a quantization parameter delta value according to the following equations:

$$Qp'_Y = Qp_Y + QpBd\text{Offset}_Y \quad \text{EQUATION 3}$$

$$Qp_Y = ((qP_{Y\_PRED} + CuQp\text{DeltaVal} + 52 + 2*QpBd\text{Offset}_Y)\%(52 + QpBd\text{Offset}_Y)) QpBd\text{Offset}_Y \quad \text{EQUATION 4}$$

where
$QpBd\text{Offset}_Y$ is the quantization parameter range offset and is derived by $QpBd\text{Offset}_Y = 6*\text{bit\_depth\_luma\_minus8}$;
bit_depth_luma_minus8 is equal to the bit depth of luma (bitDepthY) minus 8;
$qP_{Y\_PRED}$ is equal to:
 a slice luma quantization parameter derived from variables signaled in a slice segment header, or
 the luma quantization parameter of the last coding unit in the previous quantization group in decoding order;
CuQpDeltaVal is derived from variables signaled in transform unit syntax and has a value in the inclusive range of $-(26+QpBd\text{Offset}_Y/2)$ to $+(25+QpBd\text{Offset}_Y/2)$; and
% is a modulus arithmetic operator, where x % y is remainder of x divided by y, defined only for integers x and y with x>=0 and y>0;

It should be noted that, in some examples, with respect to Equation 3 and Equation 4, $QpBd\text{Offset}_Y$ may be generalized as including any value based on the bit depth of a luma component and Equation 4 may be generalized to include any function based on a luma quantization parameter predictor value, a coding unit quantization parameter delta value, and the bit depth of a luma component. Further, it should be noted that in ITU-T H.265. CuQpDeltaVal is optionally signaled. In this manner, the process for determining a $Q_{step}$ for a current luma coding block in a coding unit in ITU-T H.265 may be generally described as inheriting a slice level QP value or a QP value from a previous CU and optionally adding an indicated QP delta value to the inherited QP value. In ITU-T H.265, a QP delta value is signaled to a decoder using a one-bit sign indicator and a variable length absolute value indicator.

Further, in ITU-T H.265, chroma quantization parameters, $Qp'_{Cb}$ and $Qp'_{Cr}$, for a coding unit are derived according to the following equations:

$$Qp'_{Cb} = qP_{Cb} + QpBd\text{Offset}_C \quad \text{EQUATION 5}$$

$$Qp'_{Cr} = qP_{Cr} + QpBd\text{Offset}_C \quad \text{EQUATION 6}$$

where
$QpBd\text{Offset}_C$ is the quantization parameter range offset and is derived by $QpBd\text{Offset}_C = 6*\text{bit\_depth\_chroma\_minus8}$;
bit_depth_chroma_minus8 is equal to the bit depth of chroma (bitDepthC) minus 8;
In ITU-T H.265, the variables $qP_{Cb}$ and $qP_{Cr}$ are set equal to a value of $Qp_C$ as specified in Table 1 based on the index qPi equal to variables $qPi_{Cb}$ and $qPi_{Cr}$.

TABLE 1

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qP-6 | where $qPi_{Cb}$ and $qPi_{Cr}$ are derived as follows:

$$qPi_{Cb} = \text{Clip3}(-QpBd\text{Offset}_C, 57, Qp_Y + pps\_cb\_qp\_\text{off-set} + slice\_cb\_qp\_\text{offset}) \quad \text{EQUATION 7}$$

$$qPi_{Cr} = \text{Clip3}(-QpBd\text{Offset}_C, 57, Qp_Y + pps\_cr\_qp\_\text{off-set} + slice\_cr\_qp\_\text{offset}) \quad \text{EQUATION 8}$$

where
Clip3(x,y,z) equals x, if z<x; equals y, if z>y; or equals z otherwise;
pps_cb_qp_offset is signalled in the picture parameter set (PPS) and has a value in the inclusive range of −12 to +12 pps_cr_qp_offset is signalled in the picture parameter set and has a value in the inclusive range of −12 to +12 slice_cb_qp_offset is signalled in the slice segment header and specifies a difference to be added to pps_cb_qp_offset and has a value in the inclusive range of −12 to +12;

slice_cr_qp_offset is signalled in the slice segment header and specifies a difference to be added to pps_cr_qp_offset and has a value in the inclusive range of −12 to +12;

It should be noted that, in some examples, with respect to Equations 5-8, $QpBdOffset_C$ may be generalized as any value based on the bit depth of a chroma component and functions for $qPi_{Cb}$ and $qPi_{Cr}$ may be generalized to include any function based on a luma quantization parameter (or variables associated therewith) and the bit depth of a chroma component. In this manner, the process for determining a $Q_{step}$ for a current chroma coding block in a coding unit in ITU-T H.265 may be generally described as determining a QP value based on a QP value associated with the luma component. Thus, in ITU-T H.265 the degree of quantization applied to a set of transform coefficients may depend on (1) slice level parameters, (2) parameters inherited from a previous coding unit, and/or (3) optionally signaled CU level delta values.

In ITU-T H.265, a quantization group size is used to determine if a delta QP value can be signaled for a particular TU. For example, an video encoder may select a CTU size of 64×64 and a quantization group size of 32×32. In this case, if the CTU is partitioned (using the quadtree structure provided in ITU-T H.265) into four 32×32 TUs, then a delta QP may be signaled for each of the four TUs. However, if the 64×64 CTU is partitioned into sixty four 8×8 TUs, then a delta QP is only sent for each 32×32 region and used for all 8×8 TUs in the region. As described above, in ITU-T H.265, a picture may be split into CTUs of equal size and each CTU may include CTBs having 16×16, 32×32, or 64×64 luma samples and the minimum size of a luma CB may be 8×8 luma samples. In ITU-T H.265, a difference value is signaled in the PPS (i.e., syntax element diff_cu_qp_delta_depth) to indicate the difference between the luma CTB size and the quantization group size. For example, if the CTB size is 64×64 and the quantization group size is 16×16, a difference value (in logarithmic notation) is signaled to indicate the quantization group size. It should be noted that in ITU-T H.265, the TU structure aligns TBs for each luma and chroma component. That is, in ITU-T H.265, a TB for a component (e.g., a chroma component) directly corresponds to a TB of another component (e.g., the luma component). Further, it should be noted that in ITU-T H.265, a quantization group is always square.

Figure 6:
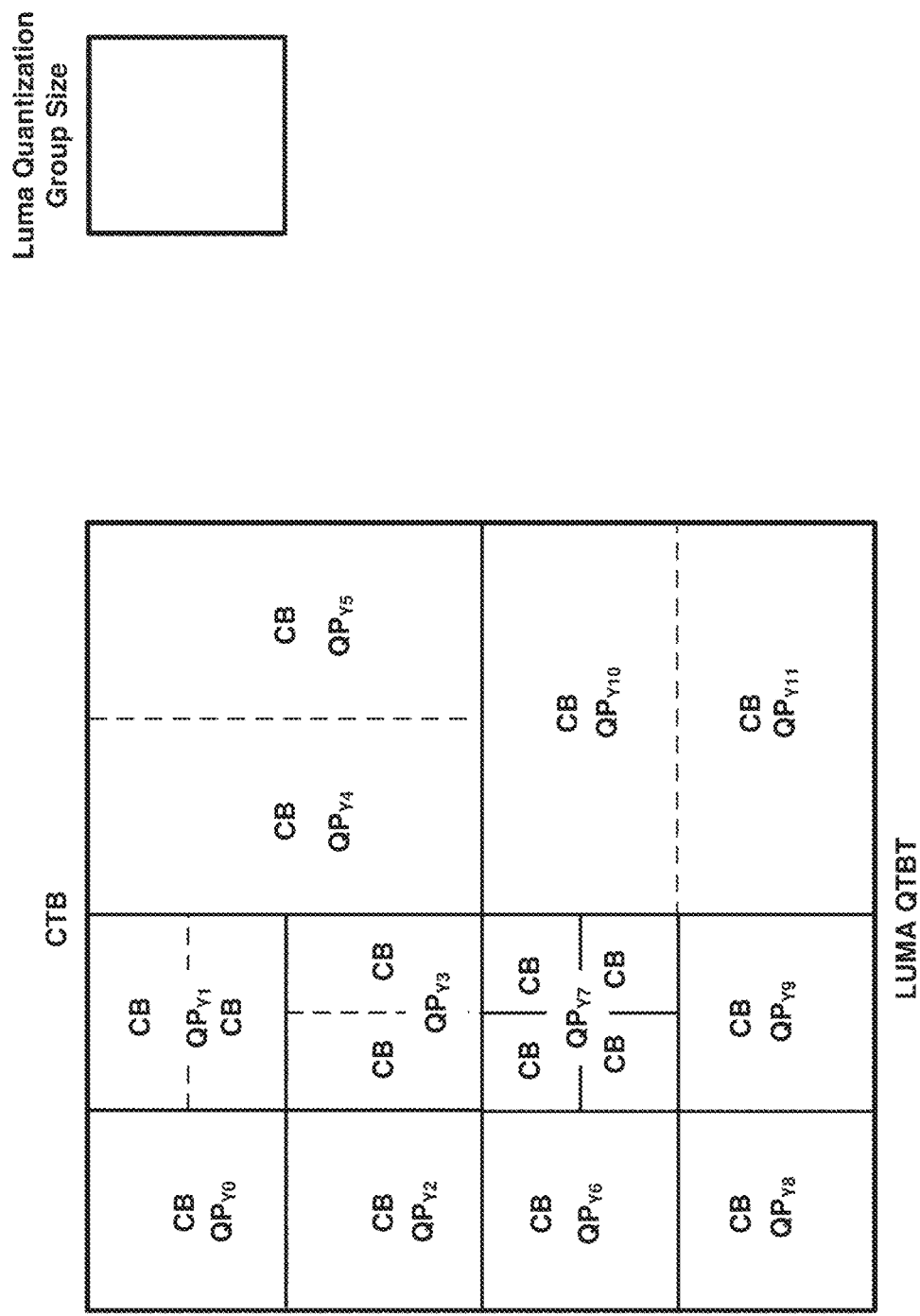
FIG. 6 is a conceptual diagram illustrating an example of determining quantization parameters for blocks of video data based on a quantization group size component in accordance with one or more techniques of this disclosure.
Figure 7:
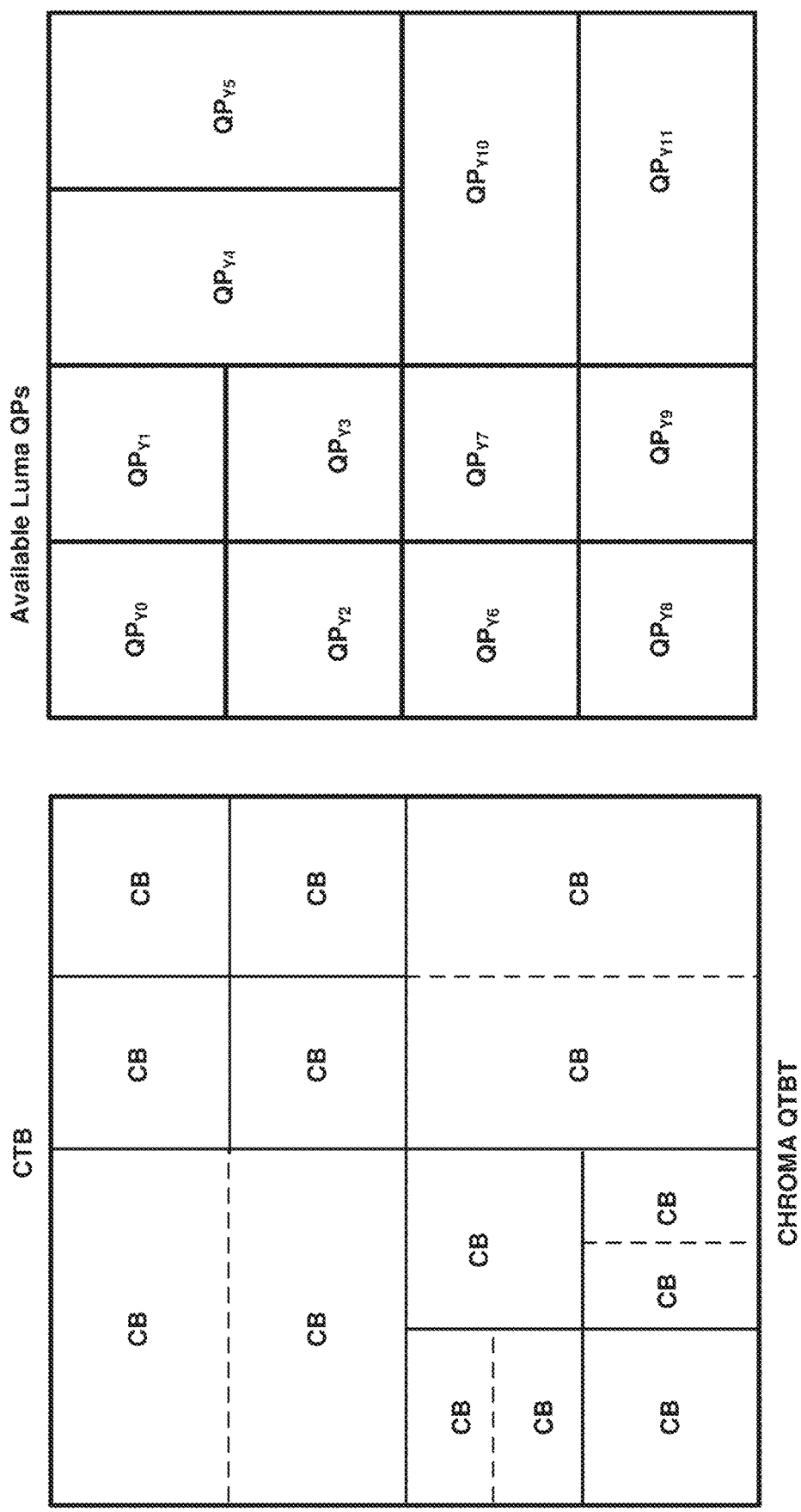
FIG. 7 is a conceptual diagram illustrating examples of quantization parameter values of a video component that may be available for determining quantization parameter values for another video component in accordance with one or more techniques of this disclosure.

As described above, in JEM, luma and chroma components may have separate QTBT structures. Further, in JEM leaf nodes may be square or rectangular. Thus, in JEM, CBs of the luma component do not necessarily align with CBs of chroma components. Thus, with respect to determining quantization group sizes, quantization parameters, and resulting $Q_{scale}$ values for CBs of the luma component and CBs of chroma components, values may be determined independently and/or based on one or more defined dependency relationships. It should be noted that in some examples, one or more flags may be signaled (e.g., at a slice level, PPS level, CTU level, and/or CB level) to indicate whether chroma quantization values are determined based on luma quantization value or whether chroma quantization values are determined independently (or alternatively, if quantization values of CBs of a luma component may be determined based on one or more quantization values determined for CBs of the chroma component). In one example, in a similar manner to ITU-T H.265, a quantization group size, or the like, may be used to determine if a delta QP value can be signaled for a particular leaf node of a QTBT (i.e., a CB of a CTU). FIG. 6 is a conceptual diagram illustrating an example of determining a QP for each CB of a luma component based on a luma quantization group size. As illustrated in FIG. 6, the number of luma QPs for the CTB is based on the luma quantization group size. In one example, a predictive QP value may be determined for the CTB and a respective delta QP value (which may be signaled to a video decoder) may be used to determine each of the respective luma QP values illustrated in FIG. 6. In one example, QP values of CBs of a chroma component may be determined based on one or more QPs determined for CBs of the luma component. FIG. 7 is a conceptual diagram illustrating an example of luma component quantization parameters that may be available for determining quantization parameter values for CBs of a chroma component. Referring to the example in FIG. 7, in one example, a QP value for each CBs of a chroma component may be based on a function of collocated QP values determined for CBs of the luma component. For example, for the top-left horizontal rectangle chroma CB illustrated in FIG. 7, a QP value may be determined based on the average of $QP_{Y0}$ and $QP_{Y1}$. For example, the average value may by input into a lookup table (LUT) in order to determine a QP value.

It should be noted that the expected performance of a video coding standard may be based on particular video coding formats and the expected values of data within a supported video coding format. For example, a video coding standard may be based on an assumption that the majority of video data transmitted using a video system will have a specific format (e.g., a particular picture resolution, dynamic range, and/or color gamut). This may result in less than ideal coding when video data does not have values within the expected ranges, particularly, when video data has a greater than expected range of values. For example, a video coding standard designed based on a high-definition video format may not provide adequate performance for coding a next generation video format, e.g., a so-called ultra-high-definition format. Further, regions of a picture may have different characteristics with respect to brightness, dynamic range, and color of samples therein. For example, a portion of a scene in shadow may have different local characteristics than a portion of the scene not in shadow although both of the regions are included in the same picture. It should be noted that the likelihood of regions of a picture having different local characteristics, increases as picture size, dynamic range, and/or color gamut increase for video data. It should be noted that in some examples, these regions may be included with the same slice of video data or, in some cases, may be included in adjacent CUs. In some cases, in order to improve coding performance, it may be desirable to lower a resulting degree of quantization for transform coefficients generated for a region of an image that is relatively bright and raise a resulting degree of quantization of transform coefficients generated for a region of an image that is relatively dark. That is, it may be acceptable to reconstruct dark portions of a picture (e.g., portions of a scene in a shadow) with less precision than bright portions of the picture.

As described above, in ITU-T H.265, the degree of quantization applied to a set of transform coefficients in a region of a picture may be modified by optionally signaling CU level QP delta values where the frequency at which QP delta values may be signaled is based on a quantization group size. Signaling a QP delta value at the CU level to adjust the degree of quantization to accommodate for variations with a picture may be less than ideal. Further, it should be noted that in ITU-T H.265, because a quantization parameter is inherited from a previous CU any adjustments made for the previous CU must be accounted for the current CU. For example, in the case where a previous CU inherits a slice level QP value of 26 and an adjustment is made to the slice level QP value, e.g., QP delta for the previous CU equals 20, the current CU inherits the adjusted QP value (46 in this case). Thus, in this case in order use a QP value of 26 for the current CU, a QP delta value must be sent for the current CU (e.g., -20). This may result in less than ideal coding performance.

As further described above, for the QTBT structure provided in JEM, determining quantization group sizes, quantization parameters, and resulting quantization scaling factor values for CBs of the luma component and CBs of chroma components may be determined independently and/or based on one or more defined dependency relationships. In some cases, as described in further detail below, according to the techniques described herein, it may be desirable to further cause level values to be scaled beyond scaling that is provided by a quantization scaling factor determined by a quantization parameter. For example, in some cases, a quantization scaling factor determined for CBs of a chroma component based on QP values for a luma component may be less than ideal. For example, referring to the example in FIG. 7, in an example, where the top-left horizontal rectangle chroma CB illustrated in FIG. 7, determines a QP value based on collocated $QP_{Y0}$, it may be desirable to further scale level values based on local characteristics. For example, if $QP_{Y0}$ maps to a relatively low level quantization for the chroma CB (e.g., using a lookup table or the like), it may be desirable to increase the level of quantization from the chroma CB to reduce a bit rate of encoded video data. The example techniques described herein may be used to adaptively scale video data in order to optimize video coding based on local characteristics of video data. As described in further detail below, scaling may be performed uses various techniques in order to ultimately scale level values. For example, scaling may be performed on residual data. It should be noted that the techniques described herein may be generally applicable to determining scaling values that may be used to effectively scale values for a component of video data based on another component of video data.

Figure 1:
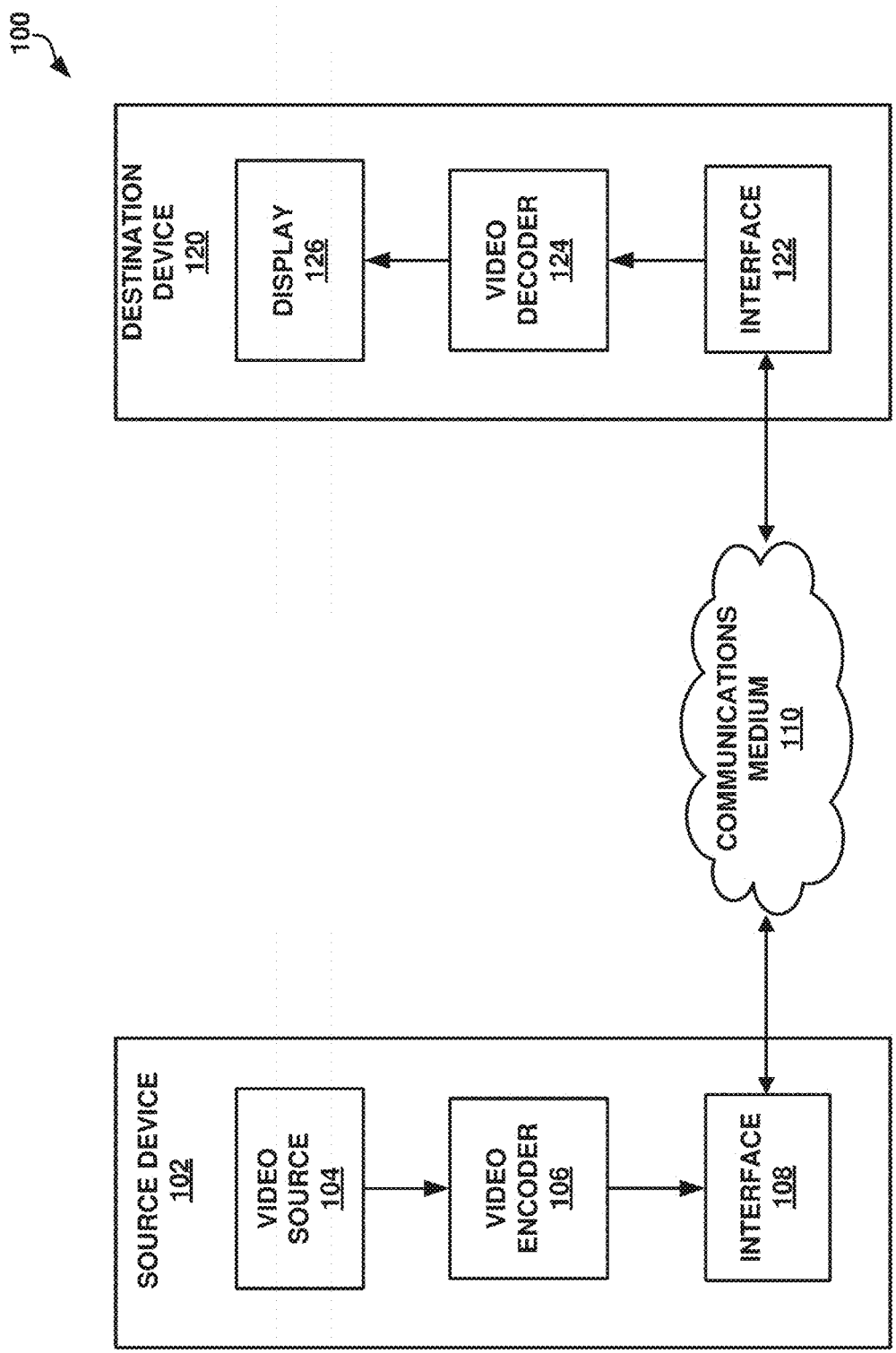
FIG. 1 is a block diagram illustrating an example of a system that may be configured to encode and decode video data according to one or more techniques of this disclosure.

FIG. 1 is a block diagram illustrating an example of a system that may be configured to code (i.e., encode and/or decode) video data according to one or more techniques of this disclosure. System 100 represents an example of a system that may adaptively scale component video data according to one or more techniques of this disclosure. As illustrated in FIG. 1, system 100 includes source device 102, communications medium 110, and destination device 120. In the example illustrated in FIG. 1, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards. European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 1, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, $I^2C$, or any other logical and physical structure that may be used to interconnect peer devices.

Referring again to FIG. 1, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, PC, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 1, video decoder 124 is described as outputting data to display 126, video decoder 124 may be configured to output video data to various types of devices and/or sub-components thereof. For example, video decoder 124 may be configured to output video data to any communication medium, as described herein.

Figure 8:
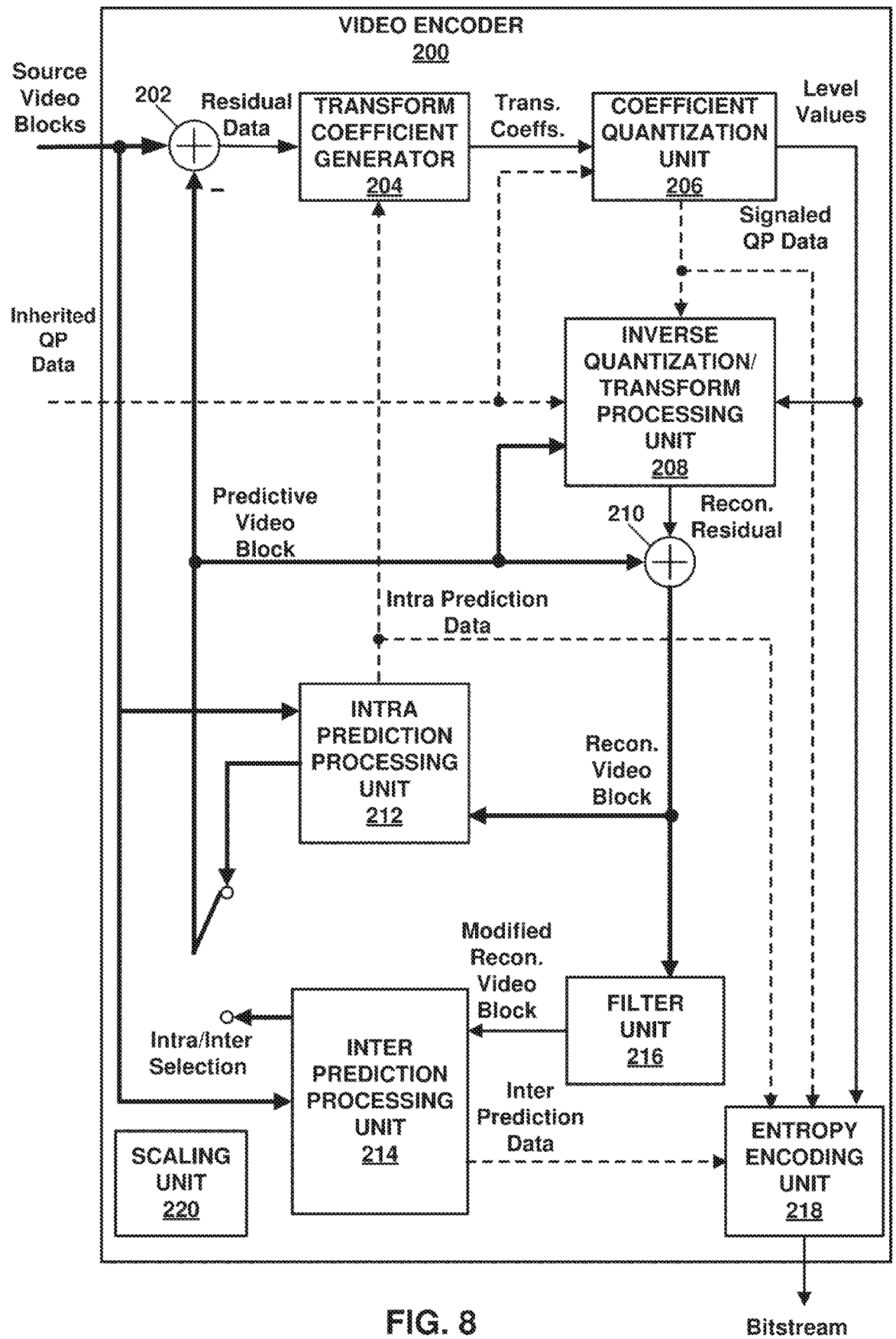
FIG. 8 is a block diagram illustrating an example of a video encoder that may be configured to encode video data according to one or more techniques of this disclosure.

FIG. 8 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 2, video encoder 200 receives source video blocks. In some examples, source video blocks may include areas of picture that has been divided according to a coding structure. For example, source video data may include macroblocks, CTUs. CBs, sub-divisions thereof, and/or another equivalent coding unit. In some examples, video encoder may be configured to perform additional sub-divisions of source video blocks. It should be noted that the techniques described herein are generally applicable to video coding, regardless of how source video data is partitioned prior to and/or during encoding. In the example illustrated in FIG. 8, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, entropy encoding unit 218, and scaling unit 220. As illustrated in FIG. 8, video encoder 200 receives source video blocks and outputs a bitstream.

In the example illustrated in FIG. 8, video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. Transform coefficient generator 204 may output transform coefficients to coefficient quantization unit 206.

Coefficient quantization unit 206 may be configured to perform quantization of the transform coefficients. As described above, the degree of quantization may be modified by adjusting a quantization scaling factor which may be determined by quantization parameters. Coefficient quantization unit 206 may be further configured to determine quantization values and output QP data (e.g., data used to determine a quantization group size and/or delta QP values) that may be used by a video decoder to reconstruct a quantization parameter (and thus a quantization scaling factor) to perform inverse quantization during video decoding. As illustrated in FIG. 8, coefficient quantization unit 206 receives inherited QP data, transform coefficients and outputs level values (i.e., quantized transform coefficients) and signaled QP data. Signaled QP data may refer to adjustments to inherited QP data for inverse quantization at a decoder. For example, signaled QP data may include the QP delta values including or similar to those described above. That is, level values and signaled QP data may be recovered by a video decoder in a lossless manner by parsing a bitstream. Inherited QP data may include higher-level (e.g., slice level, PPS level, etc.) QP data and/or data inherited from a previously coded video block. For example, as described above, in ITU-T H.265, the degree of quantization applied to a set of transform coefficients may depend on slice level parameters, parameters inherited from a previous coding unit, and/or optionally signaled CU level delta values.

As further described above and illustrated with respect to FIG. 7, in JEM, luma and chroma components may have separate QTBT structures and quantization scaling values of CBs of a chroma component may be determined based on QP data determined for CBs of the luma component (or vice-versa). Coefficient quantization unit 206 may be configured to determine respective quantization scaling values for each luma CB and each chroma CB included in a CTU and signal QP data in order for a video decoder to recover a quantization scaling value (e.g., $Q_{scale}$ illustrated in FIG. 5B). In one example, coefficient quantization unit 206 may be configured to determine the chroma quantization scaling value to be used for a chroma CB by using QP data corresponding to a collocated luma pixel. For example, coefficient quantization unit 206 may be configured to determine a chroma quantization scaling value based on the QP value corresponding to the luma pixel collocated with the upper left pixel of the chroma CB. For example, each chroma CB may be determined as a function of the mapped collocated luma QP. In one example, coefficient quantization unit 206 may be configured to determine the chroma quantization scaling value based on an average of corresponding luma QP values. It should be noted that in other examples, other statistical functions may be used, for example, the minimum, the maximum, the median, etc. Further, it should be noted that once an average (or other statistic) is determined, the quantization scaling factor for the CB may be based on function similar to the functions described above, for example, a function similar to those described above with respect to Equations 5-8. Coefficient quantization unit 206 may be configured to signal one or more flags to indicate how quantization values are derived (e.g., whether chroma QPs are dependent or independent of luma QPs) and whether quantization data is present in a bitstream (i.e., flags indicating the presence of delta QP values). For example, a CB level flag equal to 0 may indicate that a luma QP delta value and a chroma QP delta value are coded independently and a CB level flag equal to 1 may indicate that a chroma QP delta value is dependent on luma QP delta value.

As described above, it may be desirable to further cause level values to be scaled beyond scaling that is provided using a quantization scaling factor. For example, in the case where an area of a picture includes a detailed dark scene (e.g., a face in shadow), in order to optimize coding, it may be desirable to enhance that precision of a luma video component while (decreasing or increasing) the precision of chroma video components. As described above, in some cases, a quantization scaling factor for a chroma CB may be dependent on a quantization parameter of a collocated luma CB. As such, in this case, a low level of quantization with respect to a luma component may result in a low level of quantization for the chroma CB. Adaptive scaling, according to the techniques described herein, may be used to effectively adjust a level of quantization (e.g., increase or decrease quantization) based on properties and/or parameters of a video component.

Figure 9A:
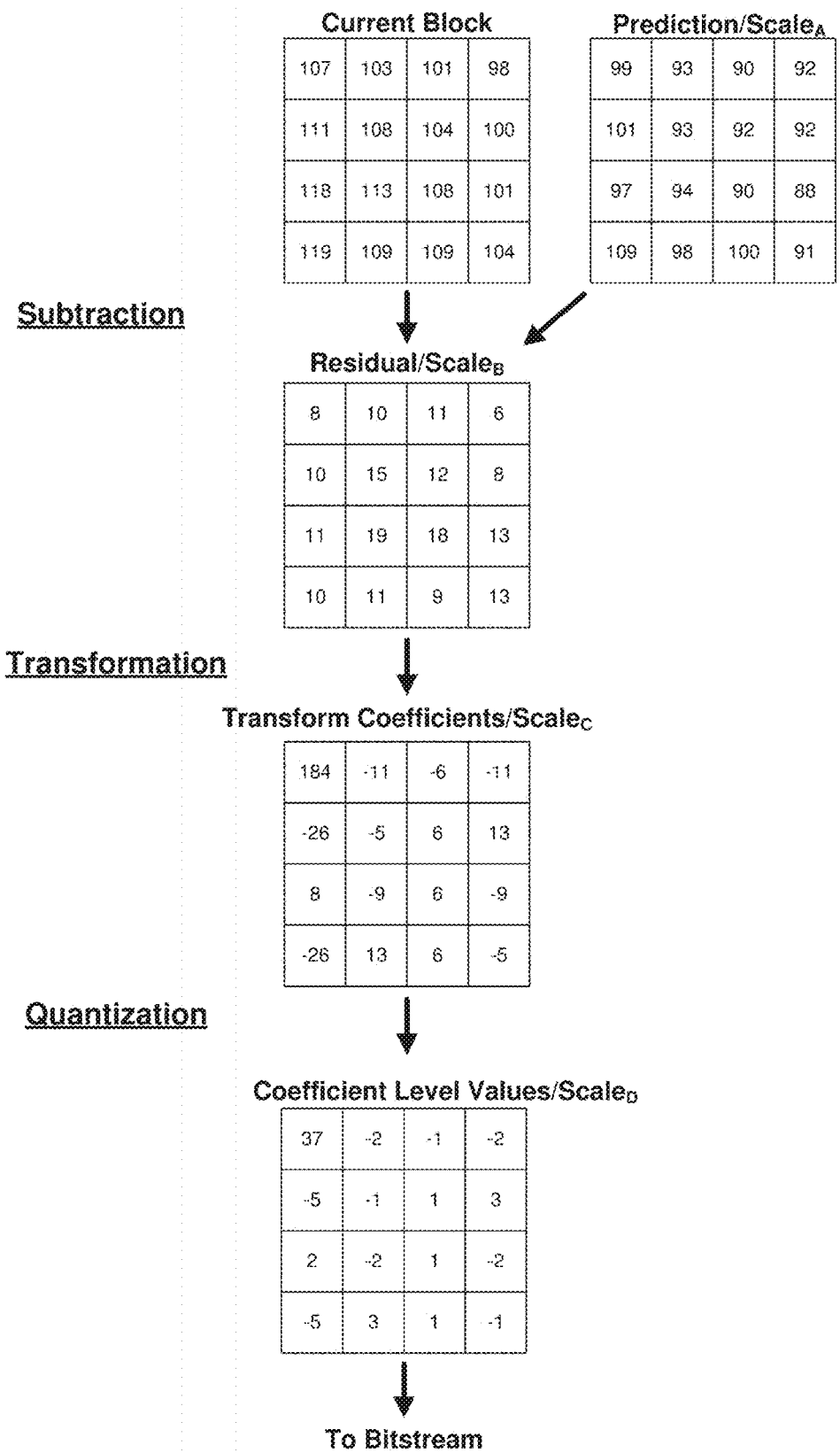
FIG. 9A are conceptual diagrams illustrating examples of coding a block of video data using adaptive component scaling in accordance with one or more techniques of this disclosure.
Figure 9B:
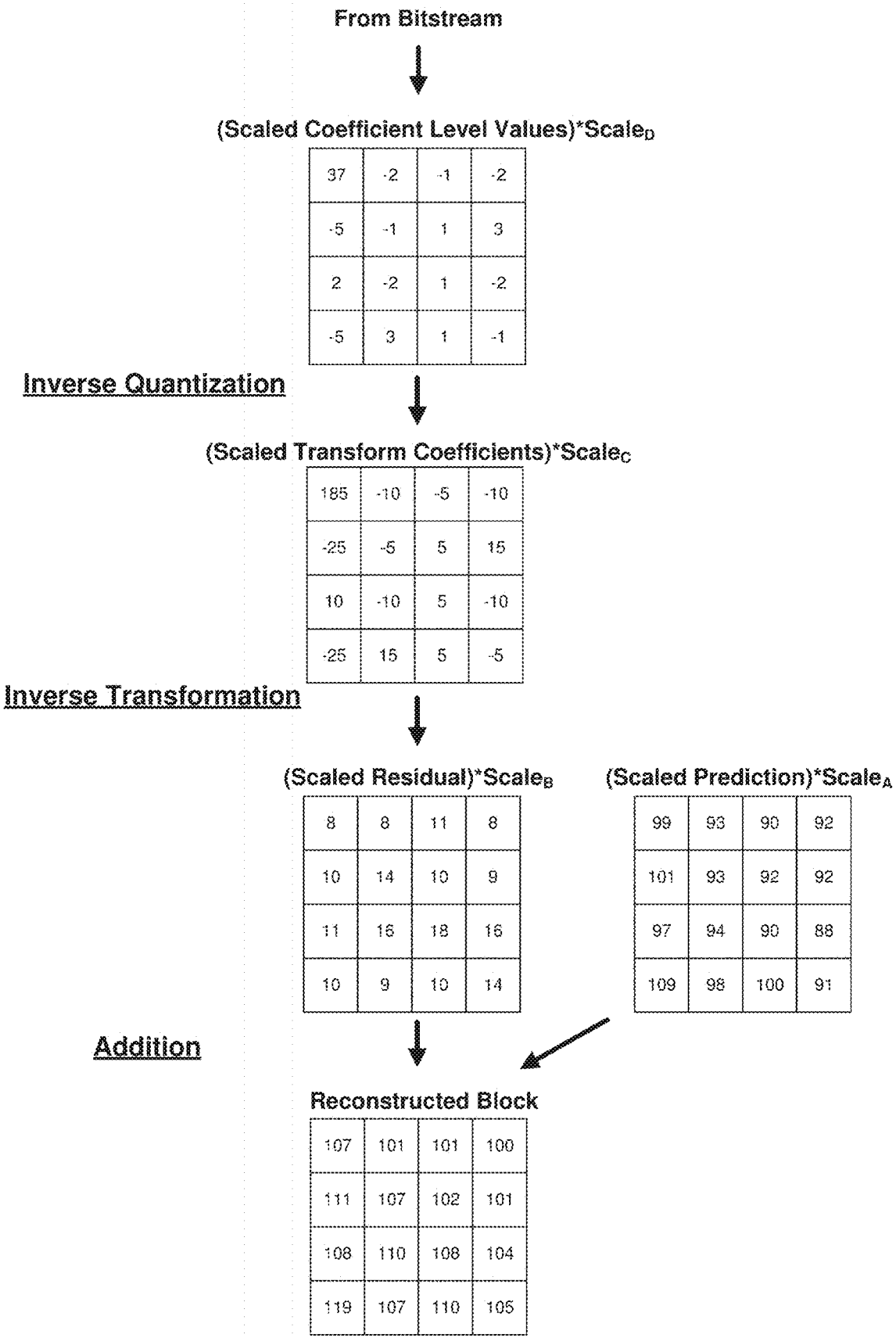
FIG. 9B are conceptual diagrams illustrating examples of coding a block of video data using adaptive component scaling in accordance with one or more techniques of this disclosure.

Referring to FIG. 8, scaling unit 220 may be configured to perform adaptive scaling according to the techniques described herein. That is, scaling unit 220 may be configured to determined scaling parameters, output scaling parameters, and/or modify video data based on scaling parameters. FIGS. 9A-9B are conceptual diagrams illustrating examples of coding a block of video data using adaptive component scaling in accordance with one or more techniques of this disclosure. In the examples illustrated in FIGS. 9A-9B, scaling parameters, i.e., $Scale_A$-$Scale_D$, that may respectively be used to scale sample values of a predictive video block, residual values, transform coefficient values, and/or coefficient level values are illustrated. Scaling parameters may include scalars (e.g., integer values), vectors, and matrices. It should be noted that applying scaling at each of the stages of the video coding process may ultimately result in coefficient level values being scaled prior to being entropy encoded at video encoder. However, it should be noted that scaling at various stages may not be equivalent due to rounding and levels of precision at each stage. For example, at a video decoder, different types of rounding may occur after inverse quantization and after an inverse transform is applied. Further, it should be noted that scaling at different stages of a coding process introduces different latency requirements. For example, to scale residual data at a video decoder, transform coefficients first need to undergo inverse transformation. Further, scaling values may be more efficiently derived at different stages of a video coding process. For example, if a DCT is used for a transformation, location (0,0) in the matrix of the transform coefficients corresponds to DC component. The DC component can be used to obtain an average component value (e.g., an average luma value of a video block) as soon as dequantization is performed for transform coefficients corresponding to DC component. In some examples the average component value may then be used for modifying the scaling of the remaining coefficient level values. In some examples, a scaling parameter value may be position dependent (e.g., similar to scaling list). Position dependency may make scaling easier to employ in the dequantization stage. Further, it should be noted that scaling at different stages may also impacts the precision needed in subsequent stage.

Figure 10:
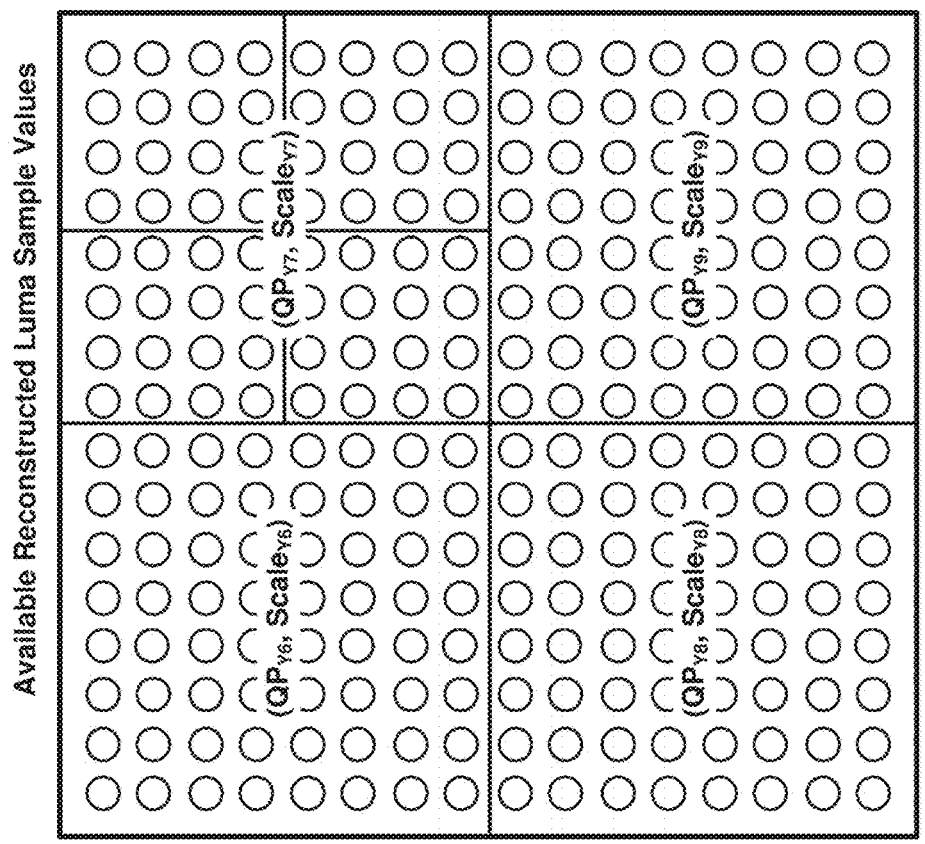
FIG. 10 is a conceptual diagram illustrating examples of video component data that may be available for determining scaling values for another video component in accordance with one or more techniques of this disclosure.
Figure 10:
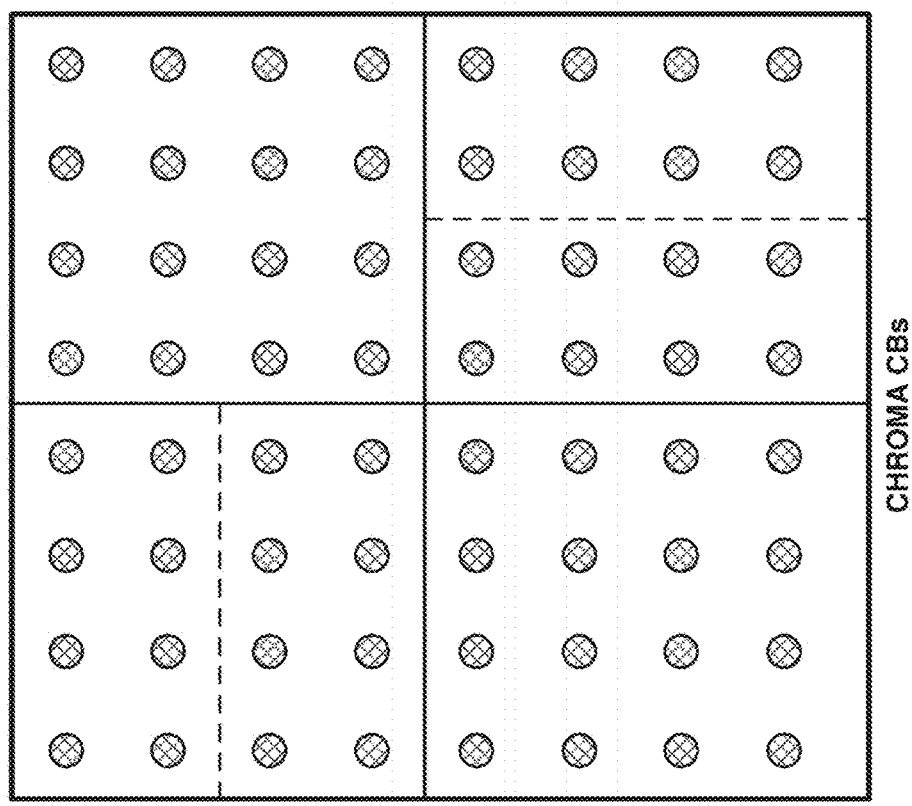

In one example, scaling data of a video component may be based on the properties and parameters of the component. For example, for a current luma CB scaling parameters may be based on a previously coded luma CB. Further, in one example, scaling parameters of a video component may be based on scaling parameters of another component of video data. FIG. 10 is a conceptual diagram illustrating examples of video component data that may be available for determining scaling values for another video component in accordance with one or more techniques of this disclosure. The CBs in the example illustrated in FIG. 10 may correspond to lower left CBs of the chroma QTBT and collocated luma CBs illustrated in FIG. 7. In the example illustrated in FIG. 10, QP values, scaling values, and reconstructed sample values (i.e., residual values and prediction values) have been determined for the luma video component. In one example, scaling unit 220 may be configured to determine scaling parameters for the CBs of the chroma component based on luma video component data and/or chroma video component data. It should be noted that in other examples, scaling unit 220 may be configured to determined scaling parameters for the luma component based on chroma video component data.

Figure 11:
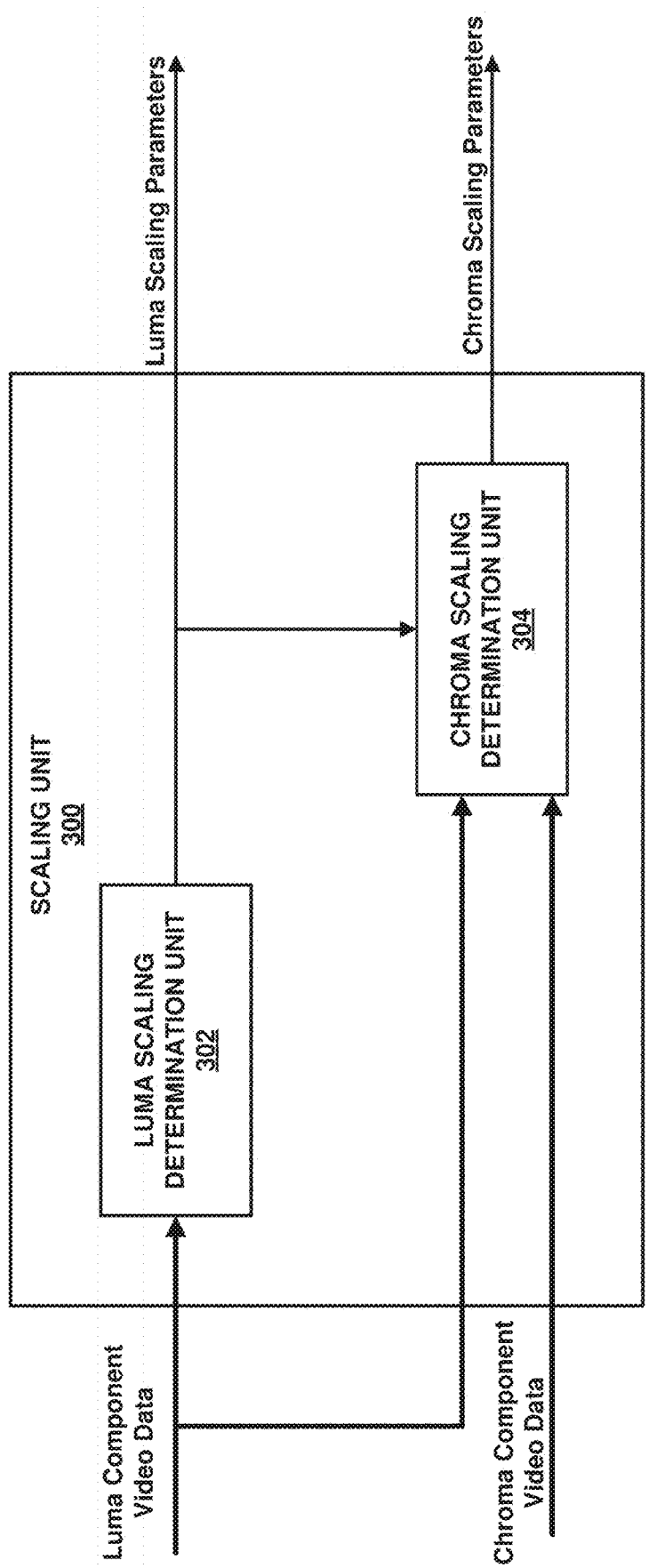
FIG. 11 is a block diagram illustrating an example of a scaling unit that may be configured to code video data according to one or more techniques of this disclosure.

FIG. 11 illustrates an example of a scaling unit 300 configured to determine scaling parameters for the chroma components based on luma video component data and/or chroma component video data. As illustrated in FIG. 11, scaling unit 300 includes luma scaling determination unit 302 and chroma scaling determination unit 304. In the example illustrated in FIG. 11, scaling unit 300 outputs scaling parameters. It should be noted that in other examples, scaling unit 300 may receive video data, perform scaling, and output scaled video data. In one example, scaling unit 300 may be configured to determine scaling parameters used for scaling coefficient level values of a CB of a chroma video component based on scaling parameters corresponding to a relative luma sample value. In one example, a relative luma sample value may include a luma sample value collocated with the upper left sample of the chroma CB. For example, for the top-left horizontal rectangle chroma CB illustrated in FIG. 10, scaling parameters for the chroma CB may be determined based on the $Scale_{Y6}$. In one example, scaling unit 300 may be configured to determine scaling parameters used for scaling coefficient level values of chroma CB based on a function of one or more luma scaling parameters. For example, for the top-left horizontal rectangle chroma CB illustrated in FIG. 10, scaling parameters for the chroma CB may be determined based on a function of $Scale_{Y6}$, $Scale_{Y7}$, $Scale_{Y8}$, and/or $Scale_{Y9}$. Example of functions include, an average, a maximum, a minimum, and/or other statistical functions. In one example, scaling unit 300 may be configured to determine scaling parameters used for scaling coefficient level values of a CB of a chroma video component based on relative luma prediction values and/or luma reconstructed samples values. For example, for the top-left horizontal rectangle chroma CB illustrated in FIG. 10, scaling parameters for the chroma CB may be determined based an average (or another statistical function) of luma prediction values and/or luma reconstructed samples values in the top-left luma CB. In one example, scaling unit 300 may be configured to determine scaling parameters used for scaling coefficient level values of a CB of a chroma video component based on determination of a sample position in the corresponding luma component and deriving the chroma scaling parameters based on the properties (e.g., corresponding scaling parameters, average luma value for block of luma samples in the neighborhood (e.g. CB) of the sample) of the luma sample at the determined luma sample position. For example, for the top-left horizontal rectangle chroma CB illustrated in FIG. 10, scaling parameters for the chroma CB may be determined by first mapping the top-left sample of current chroma CB to a corresponding sample position in the luma component (by using, for example, the luma and chroma component spatial resolution relation; some offsets, the spatial location of the top-left chroma sample with respect to the top-left chroma sample in the chroma component). The scaling parameters for the luma sample at the determined location, and the average luma value for the luma sample neighborhood, may be used to derive the chroma scaling parameters. It should be noted that in the case where scaling parameters for the chroma CB are determined based on luma component properties or parameters or a function a luma component properties or parameters, a relationship between a chroma scaling parameters and luma component properties or parameters may be defined. Relationships may be in a form of look-up tables, functions, or combinations thereof. For example, a value may be derived from one or more luma scaling parameters and the value may be used as an index in a look-up table to derive a chroma scaling parameters. Further, it should be noted there may be several ways to determine a relative luma sample value from a chroma CB. For example, a collocated area may be determined based on luma and/or chroma partitioning types, and/or chroma formats. Thus, scaling unit 300 may be configured to determine scaling parameters for the chroma components based on various types of available luma video component data and/or chroma component video data. In one example, a plurality of luma scaling parameters may be mapped to a single value (e.g., by use of average) when used for predicting the chroma scaling parameters.

In one example, flags may be used to indicate if and/or how a scaling parameter for a chroma CB is determined based on luma video component data and/or chroma component video data. For example, one or more flags may include a CB level flag. CTU level flag, a slice level flag, a PPS level flag, a Sequence Parameter Set (SPS) level flag, or the like. For example, a flag may be signaled for each chroma CB to indicate if a scaling parameter value dependency relationship exists for the particular CB. Further, in some examples, dependency relationships may only be enabled for particular slice types (e.g., intra slice types) and/or particular intra prediction modes (e.g., enabled for cross-component prediction techniques (e.g., a cross-component Linear Model (LM)) or enabled for non-cross-component prediction techniques).

In one example, when a luma component and chroma component have different partitioning, a first process for determining scaling parameters for the luma component may be defined and a distinct second process for determining scaling parameters for the chroma component may be defined. Further, in one example, when a luma component and chroma component have the same partitioning, a third process for determining scaling parameters for the luma component may be defined and a distinct fourth process for determining scaling parameters for the chroma component may be defined. In one example, when a luma component and chroma component have the same partitioning, the same defined process may be used for determining scaling parameters for the luma component and for the chroma component. In one example, when a luma component and chroma component have the same partitioning, a first defined process may be used for determining scaling parameters for the luma component and for the chroma component, and when a luma component and chroma component do not have same partitioning, a second defined process may be used for determining scaling parameters for the luma component and for the chroma component. In one example, when a luma component and chroma component have different partitioning, a first process for scaling the luma component may be defined and a distinct second process for scaling the chroma component may be defined. Further, in one example, when a luma component and chroma component have the same partitioning, a third process for scaling the luma component may be defined and a distinct fourth process for scaling parameters the chroma component may be defined. In one example, when a luma component and chroma component have the same partitioning, the same defined process may be used for scaling the luma component and for the chroma component. In one example, when a luma component and chroma component have the same partitioning, a first defined process may be used for scaling the luma component and for the chroma component, and when a luma component and chroma component do not have same partitioning, a second defined process may be used for scaling the luma component and for the chroma component. In one example, luma and chroma are determined to have same partitioning, if the partitioning of chroma component may be determined based on the partitioning of luma component. In one example, luma and chroma are determined to have same partitioning, if the partitioning of luma component may be determined based on the partitioning of chroma component.

Referring again to FIG. 8, as illustrated in FIG. 8, quantized transform coefficients are output to inverse quantization/transform processing unit 208. Inverse quantization/transform processing unit 208 may be configured to apply an inverse quantization and/or an inverse transformation to generate reconstructed residual data. Further, inverse quantization/transform processing unit 208 may be configured to apply inverse scaling. As illustrated in FIG. 8, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction. Intra prediction processing unit 212 may be configured to select an intra prediction mode for a video block to be coded. Intra prediction processing unit 212 may be configured to evaluate a frame and/or an area thereof and determine an intra prediction mode to use to encode a current block. As illustrated in FIG. 8, intra prediction processing unit 212 outputs intra prediction data (e.g., syntax elements) to entropy encoding unit 218 and transform coefficient generator 204. A transform performed on residual data may be mode dependent. Further, in some examples, adaptive scaling may be mode dependent. In ITU-T H.265, defined possible intra prediction modes include a planar (i.e., surface fitting) prediction mode (predMode: 0), a DC (i.e., flat overall averaging) prediction mode (predMode: 1), and 33 angular prediction modes (predMode: 2-34). In JEM, defined possible intra-prediction modes include a planar prediction mode (predMode: 0), a DC prediction mode (predMode: 1), and 65 angular prediction modes (predMode: 2-66). It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes. Further, in some examples, a prediction for a chroma component may be inferred from an intra prediction for a luma prediction mode.

Inter prediction processing unit 214 may be configured to perform inter prediction coding for a current video block. Inter prediction processing unit 214 may be configured to receive source video blocks and calculate a motion vector for PUs of a video block. A motion vector may indicate the displacement of a PU, or the like, of a video block within a current video frame relative to a predictive block within a reference frame. Inter prediction coding may use one or more reference pictures. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. A motion vector and associated data may describe, for example, a horizontal component of the motion vector, a vertical component of the motion vector, a resolution for the motion vector (e.g., one-quarter pixel precision), a prediction direction and/or a reference picture index value. Further, a coding standard, such as, for example ITU-T H.265, may support motion vector prediction. Motion vector prediction enables a motion vector to be specified using motion vectors of neighboring blocks. Examples of motion vector prediction include advanced motion vector prediction (AMVP), temporal motion vector prediction (TMVP), so-called "merge" mode, and "skip" and "direct" motion inference. Further. JEM supports advanced temporal motion vector prediction (ATMVP) and Spatial-temporal motion vector prediction (STMVP). Inter prediction processing unit 214 may be configured to perform motion vector prediction. Inter prediction processing unit 214 may be configured to generate a predictive block using the motion prediction data. For example, inter prediction processing unit 214 may locate a predictive video block within a frame buffer (not shown in FIG. 8). It should be noted that inter prediction processing unit 214 may further be configured to apply one or more interpolation filters to a reconstructed residual block to calculate sub-integer pixel values for use in motion estimation. Inter prediction processing unit 214 may output motion prediction data for a calculated motion vector to entropy encoding unit 218. As illustrated in FIG. 8, inter prediction processing unit 214 may receive reconstructed video block via filter unit 216. Filter unit 216 may be configured to perform deblocking and/or Sample Adaptive Offset (SAO) filtering. Deblocking refers to the process of smoothing the boundaries of reconstructed video blocks (e.g., make boundaries less perceptible to a viewer). SAO filtering is a non-linear amplitude mapping that may be used to improve reconstruction by adding an offset to reconstructed video data.

Referring again to FIG. 2, entropy encoding unit 218 receives quantized transform coefficients and predictive syntax data (i.e., intra prediction data, motion prediction data, QP data, etc.). It should be noted that in some examples, coefficient quantization unit 206 may perform a scan of a matrix including quantized transform coefficients before the coefficients are output to entropy encoding unit 218. In other examples, entropy encoding unit 218 may perform a scan. Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom. As described above, flags may be used to indicate if and/or how a scaling parameter for a chroma CB is determined based on luma video component data and/or chroma component video data. Values of these flags may be signaled in the bitstream. Further, one or more values used by a video decoder to determine a scaling parameters may be included in the bitstream.

Figure 12:
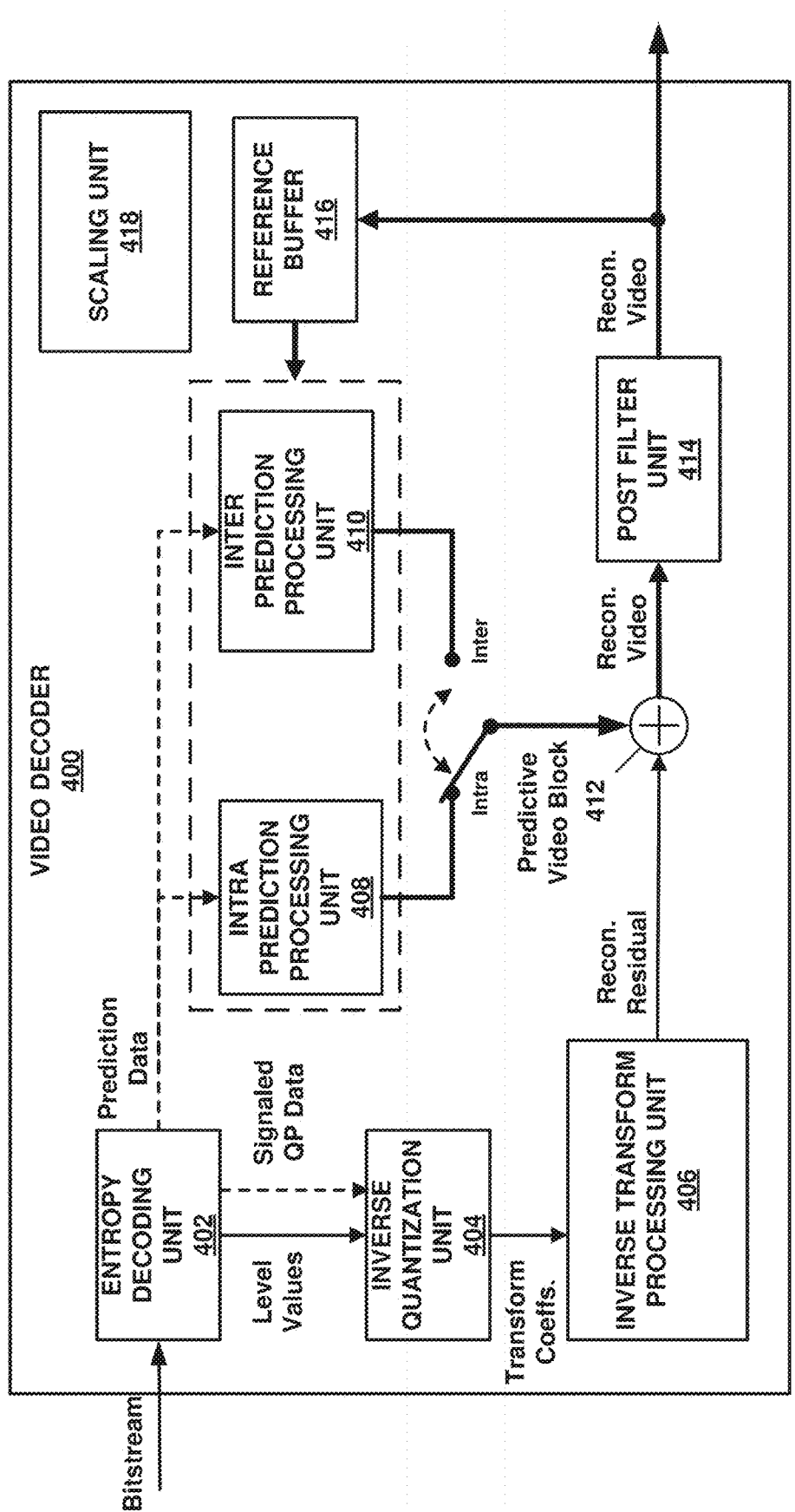
FIG. 12 is a block diagram illustrating an example of a video decoder that may be configured to decode video data according to one or more techniques of this disclosure.

FIG. 12 is a block diagram illustrating an example of a video decoder that may be configured to decode video data according to one or more techniques of this disclosure. In one example, video decoder 400 may be configured to determine a scaling parameter for a CB based on one or more of the techniques described above. Video decoder 400 may be configured to perform intra prediction decoding and inter prediction decoding and, as such, may be referred to as a hybrid decoder. In the example illustrated in FIG. 12 video decoder 400 includes an entropy decoding unit 402, inverse quantization unit 404, inverse transformation processing unit 406, intra prediction processing unit 408, inter prediction processing unit 410, summer 412, post filter unit 414, reference buffer 416, and scaling unit 418. Video decoder 400 may be configured to decode video data in a manner consistent with a video encoding system, which may implement one or more aspects of a video coding standard. It should be noted that although example video decoder 400 is illustrated as having distinct functional blocks, such an illustration is for descriptive purposes and does not limit video decoder 400 and/or sub-components thereof to a particular hardware or software architecture. Functions of video decoder 400 may be realized using any combination of hardware, firmware, and/or software implementations.

As illustrated in FIG. 12, entropy decoding unit 402 receives an entropy encoded bitstream. Entropy decoding unit 402 may be configured to decode quantized syntax elements and quantized coefficients from the bitstream according to a process reciprocal to an entropy encoding process. Entropy decoding unit 402 may be configured to perform entropy decoding according any of the entropy coding techniques described above. Entropy decoding unit 402 may parse an encoded bitstream in a manner consistent with a video coding standard.

Referring again to FIG. 12, inverse quantization unit 404 receives quantized transform coefficients (i.e., level values) and quantization parameter data from entropy decoding unit 402. Quantization parameter data may include any and all combinations of delta QP values and/or quantization group size values and the like described above. Video decoder 400 and/or inverse quantization unit 404 may be configured to determine quantization values used for inverse quantization based on values signaled by a video encoder and/or through video properties and/or coding parameters. That is, inverse quantization unit 404 may operate in a reciprocal manner to coefficient quantization unit 206 described above. Inverse quantization unit 404 may be configured to apply an inverse quantization. Inverse transform processing unit 406 may be configured to perform an inverse transformation to generate reconstructed residual data. The techniques respectively performed by inverse quantization unit 404 and inverse transform processing unit 406 may be similar to techniques performed by inverse quantization/transform processing unit 208 described above. Inverse transform processing unit 406 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether particular transform (or type of particular transform) is performed may be dependent on an intra prediction mode. As illustrated in FIG. 12, reconstructed residual data may be provided to summer 412. Summer 412 may add reconstructed residual data to a predictive video block and generate reconstructed video data. A predictive video block may be determined according to a predictive video technique (i.e., intra prediction and inter frame prediction). In one example, video decoder 400 and the post filter unit 414 may be configured to determine quantization values and use them for post filtering (e.g., deblocking). In one example, other functional blocks of the video decoder 400 which make use of quantization values may determine quantization values based on received signaling and use that for decoding.

Intra prediction processing unit 408 may be configured to receive intra prediction syntax elements and retrieve a predictive video block from reference buffer 416. Reference buffer 416 may include a memory device configured to store one or more frames of video data. Intra prediction syntax elements may identify an intra prediction mode, such as the intra prediction modes described above. In one example, intra prediction processing unit 408 may reconstruct a video block using according to one or more of the intra prediction coding techniques describe herein. Inter prediction processing unit 410 may receive inter prediction syntax elements and generate motion vectors to identify a prediction block in one or more reference frames stored in reference buffer 416. Inter prediction processing unit 410 may produce motion compensated blocks, possibly performing interpolation based on interpolation filters. Identifiers for interpolation filters to be used for motion estimation with sub-pixel precision may be included in the syntax elements. Inter prediction processing unit 410 may use interpolation filters to calculate interpolated values for sub-integer pixels of a reference block. Post filter unit 414 may be configured to perform filtering on reconstructed video data. For example, post filter unit 414 may be configured to perform deblocking and/or SAO filtering, as described above with respect to post filter unit 416. Further, it should be noted that in some examples, post filter unit 414 may be configured to perform proprietary discretionary filter (e.g., visual enhancements). As illustrated in FIG. 4, a reconstructed video block may be output by video decoder 400.

Figure 13A:
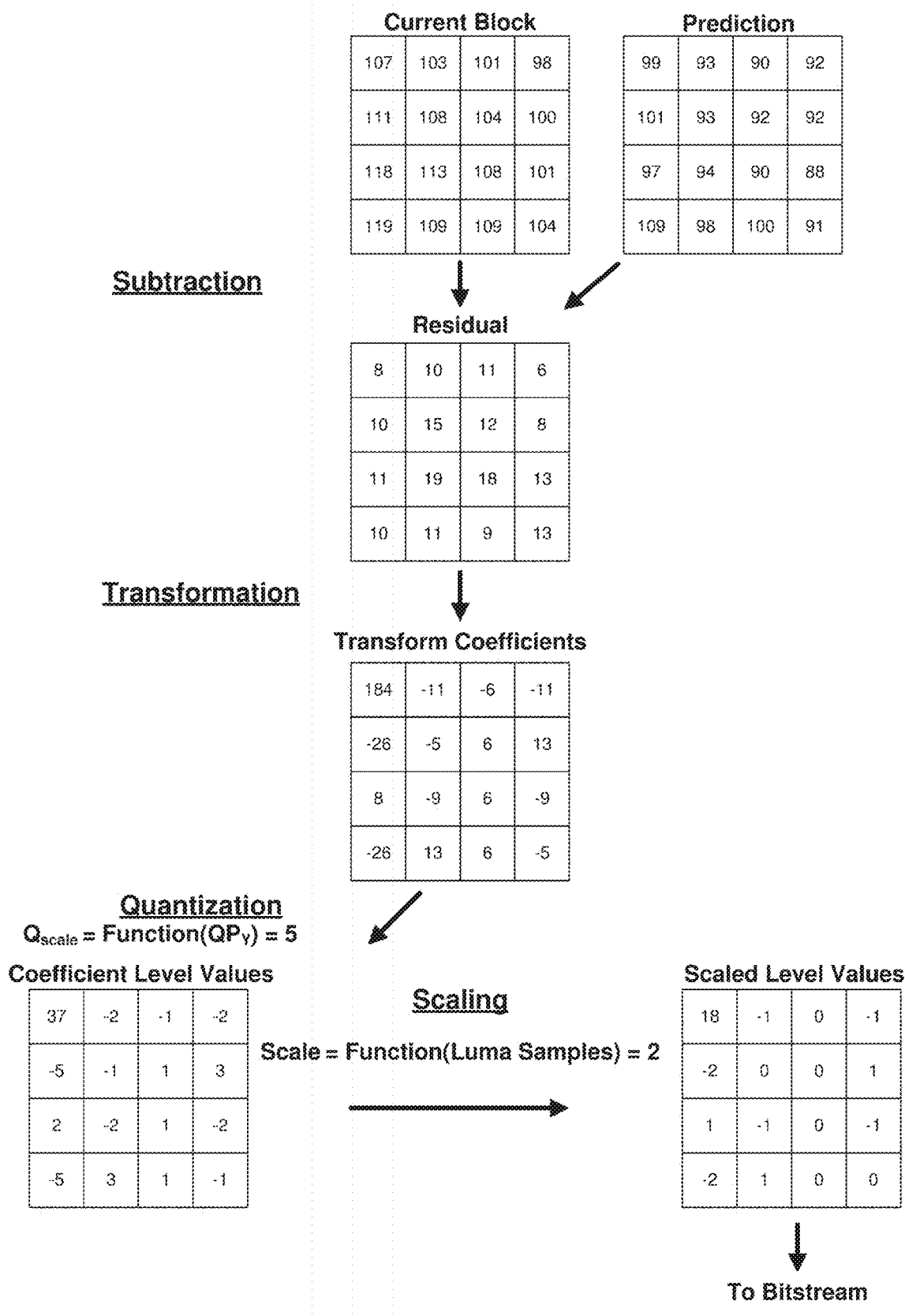
FIG. 13A are conceptual diagrams illustrating examples of coding a block of video data using adaptive component scaling in accordance with one or more techniques of this disclosure.
Figure 13B:
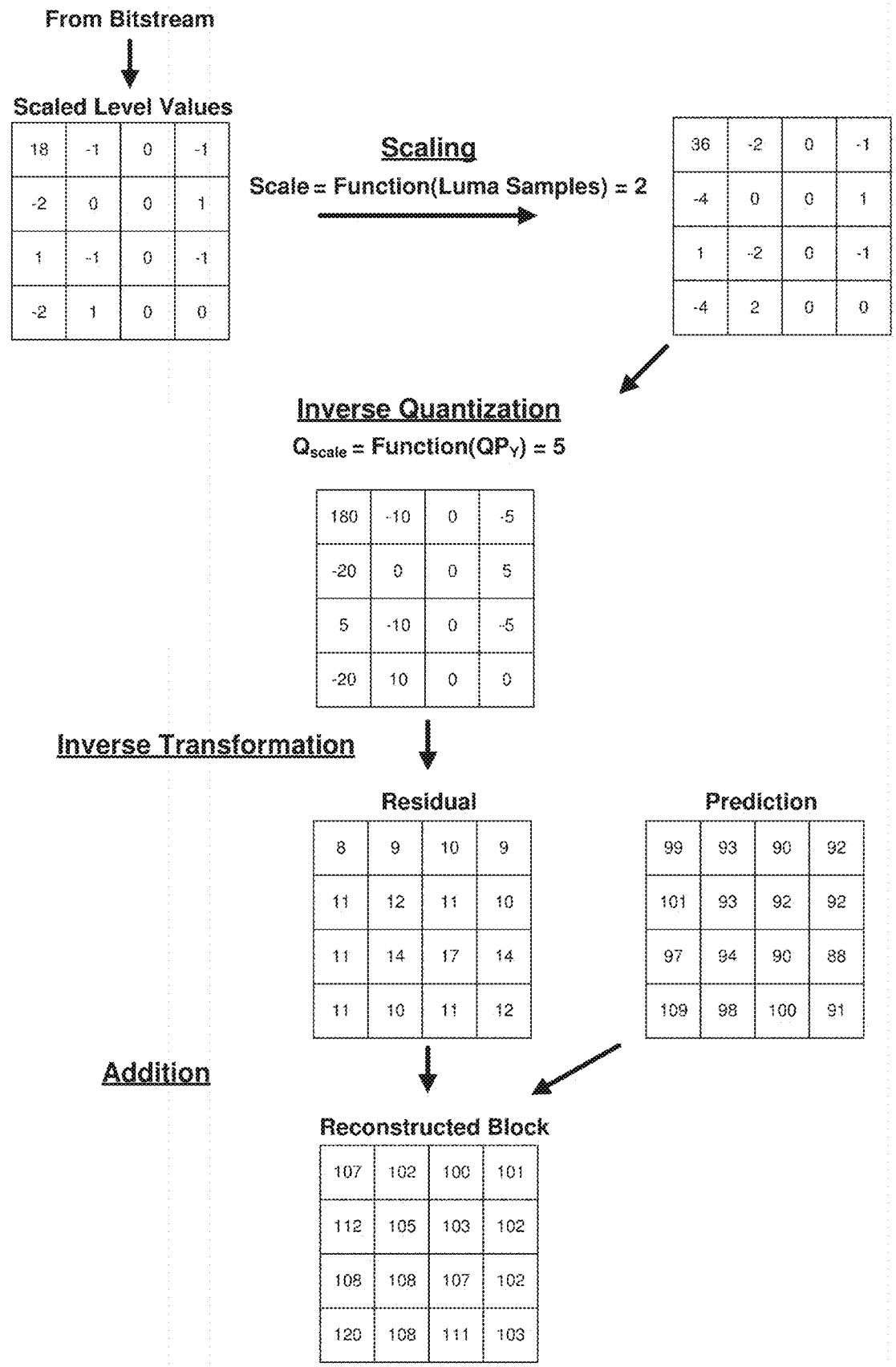
FIG. 13B are conceptual diagrams illustrating examples of coding a block of video data using adaptive component scaling in accordance with one or more techniques of this disclosure.

As illustrated in FIG. 12, video decoder 400 includes scaling unit 418. Scaling unit 418 may be similar to scaling unit 300 described above and may determine scaling parameters according to one or more of the techniques described herein. Further, scaling unit 418 may recover values that have been scaled (e.g., by performing multiplication and/or performing shifting operations). FIGS. 13A-13B, illustrates an example where chroma level values are further scaled based on a function of luma samples. In the example illustrated in FIGS. 13A-13B, the level of chroma component data is reduced based on the luma sample values. For example, as described above, the level of chroma component data may be adjusted based on the brightness of a scene. Thus, with respect to the example illustrated in FIGS. 13A-13B, the function of luma samples may be used to determine whether a scene is relative dark or bright. In one example, a mean of luma samples may be used to determine the brightness of a scene. Table 2 provides an example of a relationship between a mean of luma sample values and a scaling parameter. It should be noted that the floating point scale in Table 2 can be expressed as an integer and a shift. In Table 2 "<<" indicates a shifting operation (e.g., a shifting operation as defined in ITU-T H.265)

TABLE 2

| Mean | 0-300 | 301-366 | 367-433 | 434-500 | 501-566 | 567-633 | 634-700 | 701-766 | 767-833 | 834-1023 |
|---|---|---|---|---|---|---|---|---|---|---|
| Scale | 0.71 | 0.79 | 0.89 | 1 | 1.12 | 1.26 | 1.41 | 1.58 | 1.78 | 2 |
| Scale<<6 | 45 | 51 | 57 | 64 | 72 | 81 | 90 | 101 | 114 | 128 |

Referring to FIG. 13B, at a video decoder a scaling parameter is determined and resulting level values are recovered prior to inverse quantization. As described above, scaling may occur at various stages of a coding process. In this manner, video decoder 400 may be configured to generate reconstructed video data according to one or more of the techniques described herein. In this manner, video decoder 400 may be configured to receive level values corresponding to a chroma coding block, wherein the chroma coding block is independent of a luma component partition structure, determine a scaling parameter for the chroma coding block based on one or more properties of the luma component, and generate video data values based on the determined scaling parameter.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another. e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor." as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

<Overview>

In one example, a method of encoding video data comprises receiving video data values corresponding to a chroma coding block, wherein the chroma coding block is independent of a luma component partition structure, determining a scaling parameter for the chroma coding block based on one or more properties of the luma component, and generating level values based on the scaling parameter.

In one example, a device for video encoding comprises one or more processors configured to receive video data values corresponding to a chroma coding block, wherein the chroma coding block is independent of a luma component partition structure, determine a scaling parameter for the chroma coding block based on one or more properties of the luma component, and generate level values based on the scaling parameter.

In one example, a non-transitory computer-readable storage medium comprises instructions stored thereon that, when executed, cause one or more processors of a device to receive video data values corresponding to a chroma coding block, wherein the chroma coding block is independent of a luma component partition structure, determine a scaling parameter for the chroma coding block based on one or more properties of the luma component, and generate level values based on the scaling parameter.

In one example, an apparatus comprises means for receiving video data values corresponding to a chroma coding block, wherein the chroma coding block is independent of a luma component partition structure, means for determining a scaling parameter for the chroma coding block based on one or more properties of the luma component, and means for generating level values based on the scaling parameter.

In one example, a method of decoding video data, comprises receiving level values corresponding to a chroma coding block, wherein the chroma coding block is independent of a luma component partition structure, determining a scaling parameter for the chroma coding block based on one or more properties of the luma component, and generating video data values based on the determined scaling parameter.

In one example, a device for video decoding comprises one or more processors configured to receive level values corresponding to a chroma coding block, wherein the chroma coding block is independent of a luma component partition structure, determine a scaling parameter for the chroma coding block based on one or more properties of the luma component, and generate video data values based on the determined scaling parameter.

In one example, a non-transitory computer-readable storage medium comprises instructions stored thereon that, when executed, cause one or more processors of a device to receive level values corresponding to a chroma coding block, wherein the chroma coding block is independent of a luma component partition structure, determine a scaling parameter for the chroma coding block based on one or more properties of the luma component, and generate video data values based on the determined scaling parameter.

In one example, an apparatus comprises means for receiving level values corresponding to a chroma coding block, wherein the chroma coding block is independent of a luma component partition structure, means for determining a scaling parameter for the chroma coding block based on one or more properties of the luma component, and means for generating video data values based on the determined scaling parameter.

The details of one or more examples are set forth in the accompanying drawings and the description below. Other features, objects, and advantages will be apparent from the description and drawings, and from the claims.

The invention claimed is:

1. A method of decoding video data, the method comprising:
  parsing a sequence parameter set level flag and a slice level flag indicating chroma scaling which is applied to a current chroma coding block;
  mapping a top-left sample of the current chroma coding block to a corresponding sample location of a luma component sample based on a luma and chroma component spatial resolution relation;
  determining an average luma value for reconstructed luma sample values;
  determining a chroma scaling parameter according to a look-up table, wherein the look-up table provides the chroma scaling parameter by using the average luma value and
  wherein values of the look-up table are included in a bitstream; and
  scaling residual data corresponding to a chroma component of the current chroma coding block by using the determined chroma scaling parameter.

* * * * *